United States Patent
Nakaguro et al.

(10) Patent No.: US 6,302,798 B1
(45) Date of Patent: Oct. 16, 2001

(54) TORQUE REDUCER AND TORQUE TRANSMITTER INCLUDING THE SAME

(75) Inventors: Keita Nakaguro, Kyoto; Satoru Watanabe; Yukio Chihara, both of Mie; Mizuo Komine, Nara; Yasuji Echizen, Osaka; Shoichi Kubo, Mie, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/359,508

(22) Filed: Jul. 23, 1999

(30) Foreign Application Priority Data

Jul. 24, 1998 (JP) .................................. 10-208926
Aug. 7, 1998 (JP) .................................. 10-223959
Nov. 6, 1998 (JP) .................................. 10-315861

(51) Int. Cl.[7] ................................................ F16D 7/00
(52) U.S. Cl. ................................ 464/30; 192/56.33
(58) Field of Search .......................... 464/30, 35, 36, 464/37, 38, 39, 160, 164; 192/56.33, 56.57, 56.62

(56) References Cited

U.S. PATENT DOCUMENTS

| | | | |
|---|---|---|---|
| 2,490,172 | * 12/1949 | Swahnberg | 464/36 |
| 2,802,354 | * 8/1957 | Bohnhoff | 464/36 |
| 2,969,132 | * 1/1961 | Stewart | 464/36 |
| 3,185,275 | * 5/1965 | Orwin | 464/36 |
| 3,786,693 | * 1/1974 | Keipert | 464/36 |
| 3,942,337 | * 3/1976 | Leonard et al. | 464/30 |
| 4,263,996 | * 4/1981 | Putney | 192/56 R |
| 4,557,154 | * 12/1985 | Iwata et al. | 464/36 |
| 4,792,321 | 12/1988 | Lundquist . | |
| 5,383,818 | * 1/1995 | Lessat-Kaupat et al. | 464/36 |
| 5,855,518 | * 1/1999 | Tanaka et al. | 464/38 |

FOREIGN PATENT DOCUMENTS 55-21893    6/1980   (JP) .

* cited by examiner

Primary Examiner—Lynne H. Browne
Assistant Examiner—K. Thompson
(74) Attorney, Agent, or Firm—Ratner & Prestia

(57) ABSTRACT

A torque transmitter includes (a) a driver, (b) torque transmitting means for transmitting the torque generated by the driver to a follower, (c) a rotary body on the follower side, and (d) a torque reducer that reduces (or discontinues) the torque transmission when excessive torque over a threshold torque value is loaded to the rotary body on the follower side, and the torque limiter has different threshold-torque-values responsive to rotating directions of the rotary body.

17 Claims, 20 Drawing Sheets

FIG. 4A
FIG. 4B
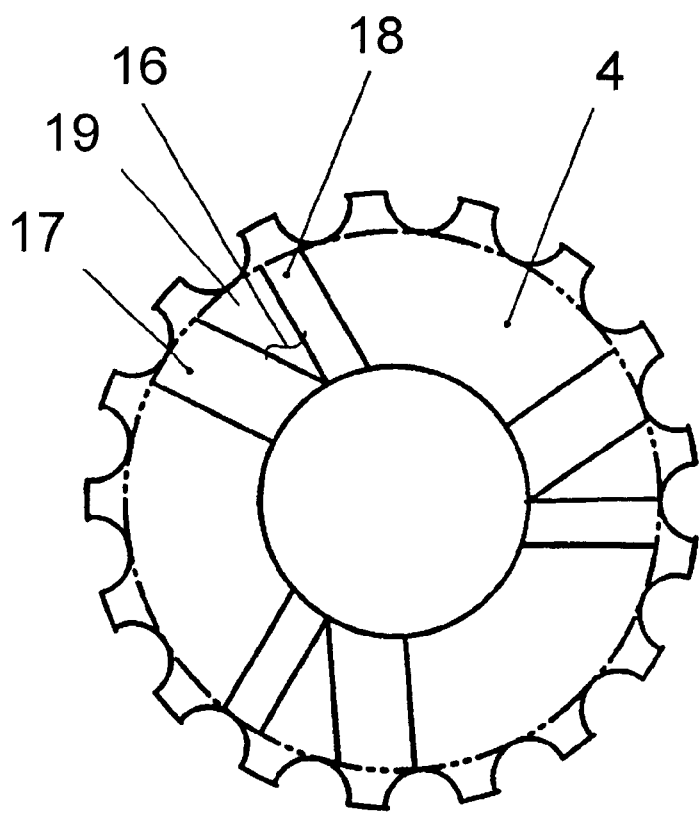

FIG. 18A
FIG. 18B  FIG. 18C
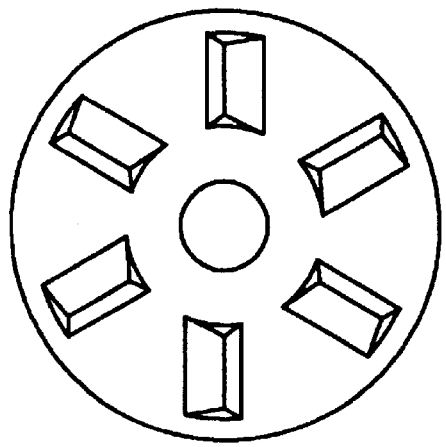 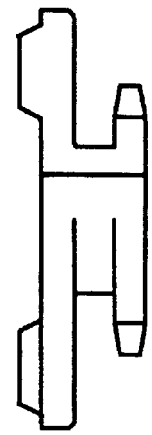
FIG. 18D
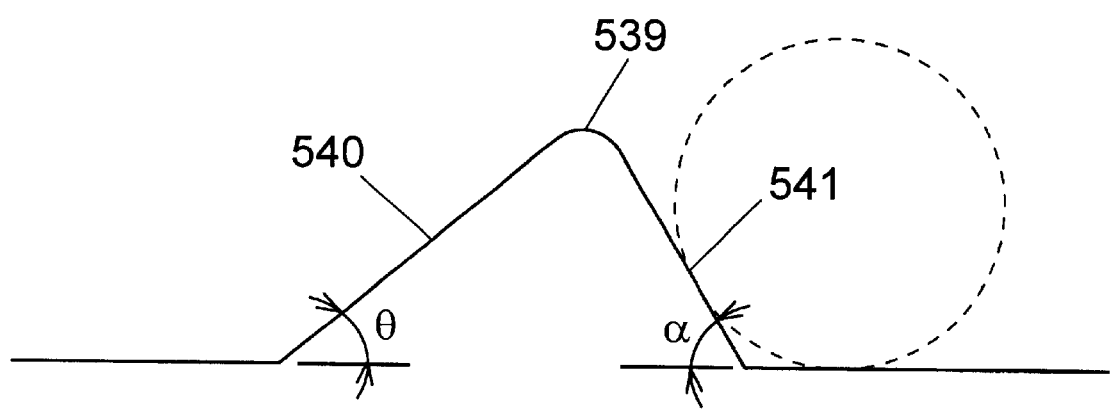

782

FIG. 22A
FIG. 22B
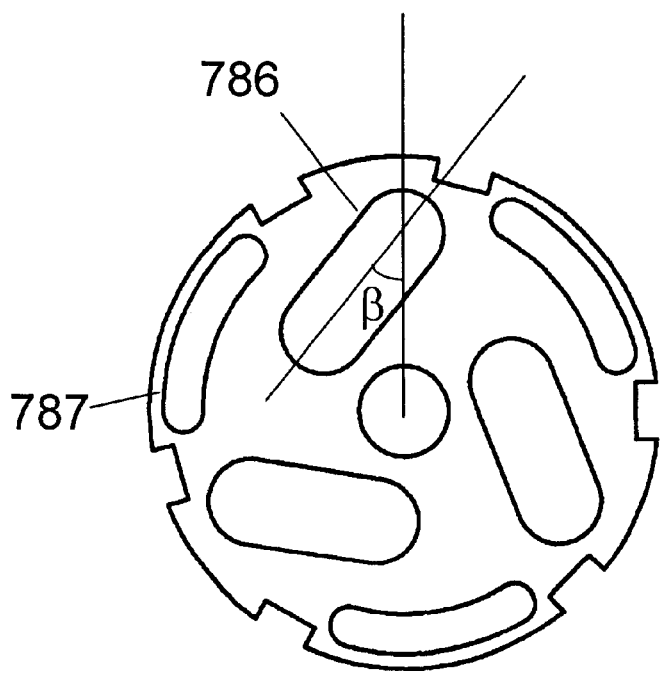

TORQUE REDUCER AND TORQUE TRANSMITTER INCLUDING THE SAME

FIELD OF THE INVENTION

The present invention relates to a torque reducer integrated into a torque transmitter that transmits torque generated by a driver to a follower, and the torque transmitter. More particularly, the present invention relates to a torque transmitter employing a motor including reduction gears, and being fit for a shutter control apparatus of electric shutters, electric storm shutters and the like.

BACKGROUND OF THE INVENTION

In recent years, vertically retractable shutters have been widely used in houses and garages, and a number of electrically driven shutters increases sharply. A shutter control apparatus for opening and closing a shutter integrates a safety function in addition to a control function. The safety function includes a mechanism that halts extension of the shutter (closing), in particular, when an obstacle is detected, or restricts a driving force.

In a conventional manner, this safety function has entailed a dedicated control circuit and switches, which has complicated an entire mechanism and increased the cost. A simple output-torque restriction function free from a control circuit, i.e. a torque transmitter integrating a torque limiter has been thus demanded from the market.

A conventional mechanical torque limiter disclosed in the Japanese Patent Application Examined Publication No. S55-21893 teaches as follows:

Each rotary body of a driver and a follower faces each other. The respective rotary bodies made of cylindrical boss member and having a flange are mounted on a driving shaft and a following shaft respectively. Both the shafts are disposed co-axially. One of two rotary bodies has angular grooves in the axial direction on its flange, and another has U-shaped grooves on its flange. A roller is disposed between the angular grooves and U-shaped grooves, which is urged to the U-shaped grooves by a torque spring.

A threshold-torque-value is set by adjusting a spring pressure. When a load over the threshold-torque-value is imposed on the torque limiter, the roller reacts the elastic force of the torque spring, and comes off the U-shaped groove. As a result, torque transmission is discontinued.

Another torque limiter has an inner rotary body, an outer rotary body and a roller in between. A spring urges the roller, which comes off the U-shaped groove, then the torque transmission is discontinued.

These conventional structures transmit the torque by engaging a roller between angular grooves and U-shaped grooves provided respectively on a flange of one rotary body and a flange of another rotary body. The roller is come off the U-shaped groove by excessive load, then torque transmission is discontinued. A limit torque is thus constant regardless of rotating directions.

When an electric shutter employs a torque transmitter including the conventional torque limiter discussed above and a motor with reduction gears as a driver, a user encounters the following problem. Assume that the torque has been adjusted to meet the condition of shutter extension (closing), i.e. detection of an obstacle at shutter extension loads an excessive torque on the torque limiter, which discontinues the torque transmission. Then the torque limiter happens to be activated at shutter retraction (opening). Therefore, the shutter retraction is sometimes bothered.

Further, when an article is caught in the electric shutter, the motor is kept driving and the torque limiter is kept working until the current to the motor is cut off. In this case, torque is varied, or noise from the torque limiter occurs, thereby displeasing people around there. Since the torque limiter is kept working in this case, a mechanical sliding section is worn out and its service life is shortened.

In order to avoid the problems discussed above, limit switches are provided in the torque limiter at upper and lower limits of traveling the electric shutter, thereby halting the motor operation.

Safety-oriented users demand a torque transmitter, which can be halted electrically in addition to its mechanical torque limiter.

Another torque limiter is disclosed in the U.S. Pat. No. 4,792,321 where a shape of teeth to which balls are urged is formed symmetrically so that torque limiter can function in both of forward and reverse directions of a rotary shaft. In this case, both the directions need an equal limit torque. This prior art also discloses a torque limiter of which teeth are asymmetric and have a shoulder preventing movement of a ball from a ball-receiving recess in one direction of input shaft so that a unidirectional torque limit and a one-way brake are provided. In this case, the torque limiter functions only in one given direction.

And yet, the structure of this prior art does not discontinue the torque transmission, but a torque value close to the limit torque is kept on transmitting. The transmitted torque is changed every time the ball climbs over the teeth, and it does not remain stable. Therefore, when the torque limiter functions, noise and vibration occur.

SUMMARY OF THE INVENTION

The present invention addresses the problems discussed above, and aims to provide a torque reducer and a torque transmitter in which a limit-torque can be set responsive to rotating directions.

Further, the present invention aims to provide a torque transmitter that can halt its driver when the torque limiter works.

The torque transmitter of the present invention is defined as this: torque generated by a driver is transmitted to a rotary body disposed at a follower, and when excessive torque over the threshold value is imposed to the rotary body on the follower, then the torque transmission is discontinued. The threshold torque is set responsive to rotating directions of the rotary body on the follower, whereby different limit-torque can be established.

Further, the torque transmitter may include a switch that is activated when the torque reducer works, thereby turning off the power to the driver.

BRIEF DESCRIPTION OF THE DRAWINGS

FIG. 4A is a plan view of the rotary body of the follower side in accordance with the second exemplary embodiment of the present invention.

FIG. 4B is a side view of the rotary body of the follower side in accordance with the second exemplary embodiment of the present invention.

FIG. 18A is a plan view of a rotary body mounted on a follower side in accordance with the twelfth embodiment of the present invention.

FIG. 18B is a front view of the rotary body mounted on the follower side in accordance with the twelfth embodiment of the present invention.

FIG. 18C is a right-side-view of the rotary body mounted on the follower side in accordance with the twelfth embodiment of the present invention.

FIG. 18D is an enlarged cross sectional view of a projected section of the rotary body on the follower side in accordance with the twelfth embodiment of the present invention.

FIG. 22A is a plan view of a retainer in accordance with the thirteenth exemplary embodiment of the present invention.

FIG. 22B is a side view of the retainer in accordance with the thirteenth exemplary embodiment of the present invention.

DETAILED DESCRIPTION OF THE EXEMPLARY EMBODIMENTS

Exemplary embodiments of the present invention are described hereinafter with reference to the accompanying drawings.

(Exemplary Embodiment 1)

Figure 1A:
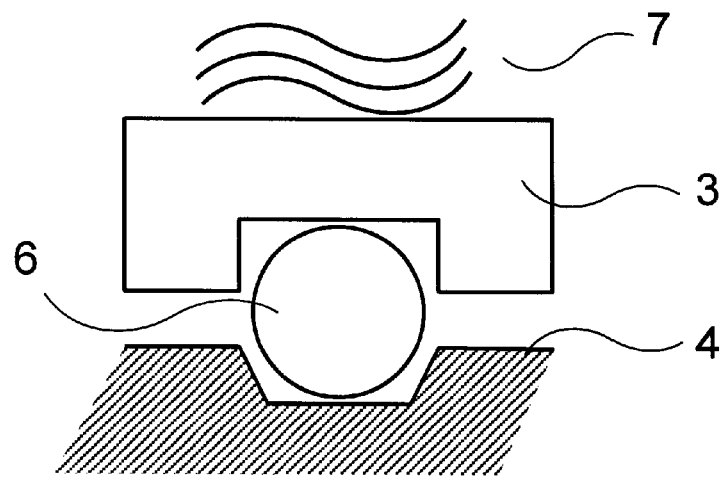
FIGS. 1A and 1B are side views illustrating a first exemplary embodiment of the present invention.
Figure 1B:
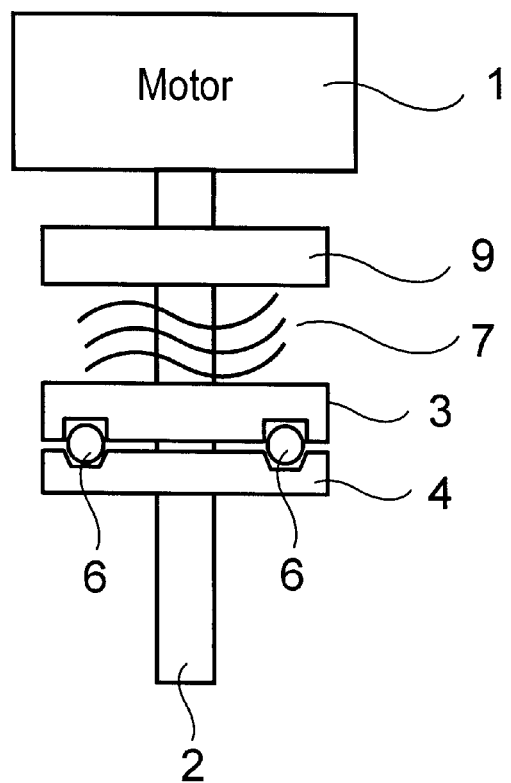

In FIGS. 1A and 1B, motor 1 rotates shaft 2. Spring 7 urges driver (or retainer) 3 towards follower (or sprocket) 4. Roller 6 is maintainable between driver 3 and follower 4 within first and second grooves 13 and 16. Follower 4 is coupled to the object for which rotation is sought. If follower 4 is receiving too much torque, roller 6 pops out of first and second grooves 13 and 16 thus reducing (typically to substantially zero) the amount of torque being received by follower 4.

Figure 1C:
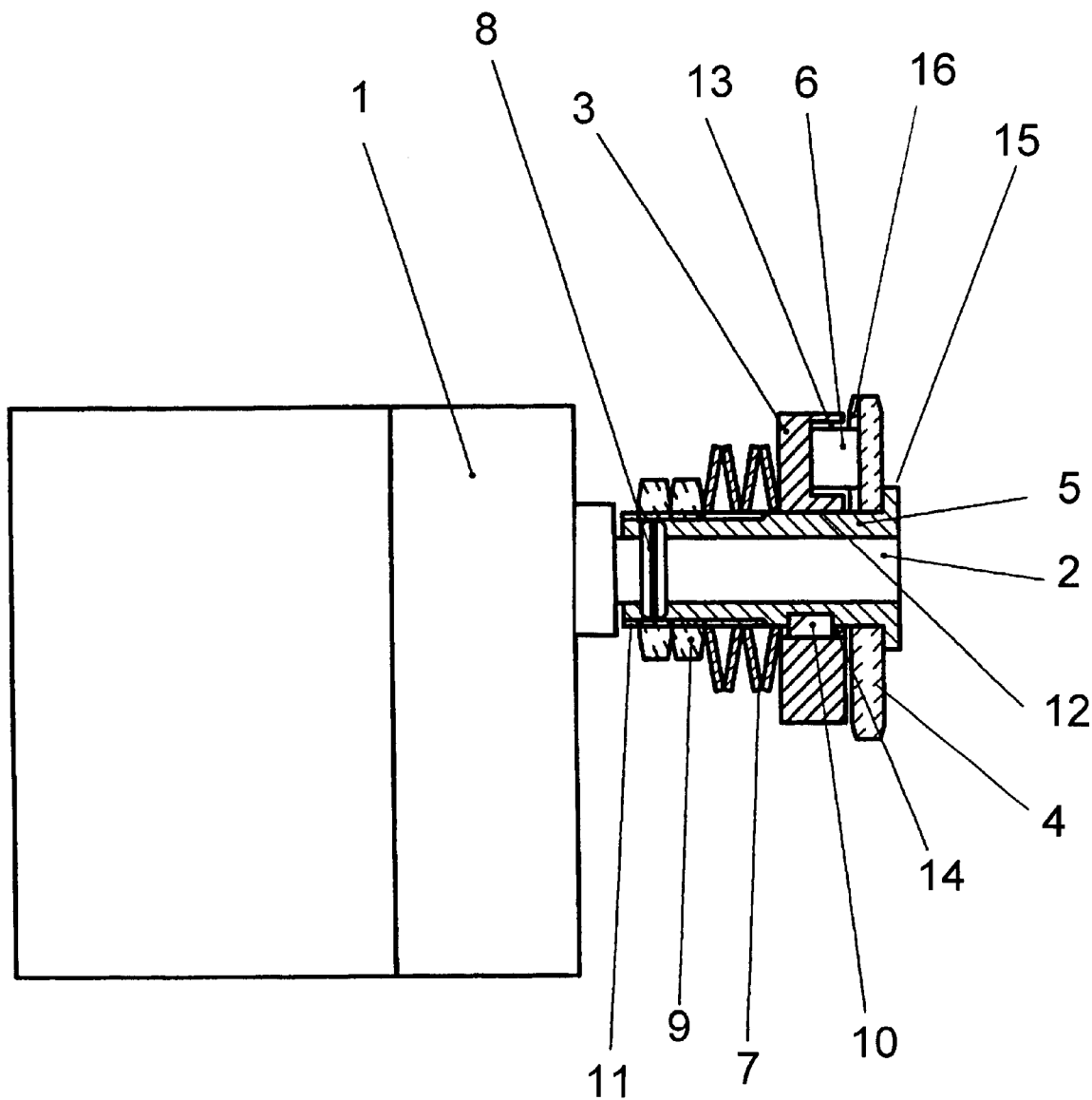
FIG. 1C is a cross sectional side view of a torque transmitter in accordance with the first exemplary embodiment of the present invention.

In FIG. 1C, sleeve 5 is fixed by pin 8 on output shaft 2 of motor 1 (driver) with reduction gears. Retainer 3 which is a rotary body of the driver side, and sprocket 4 which is a rotary body of the follower side are mounted on a cylindrical section 12 of sleeve 5. Angular groove 13 is formed on retainer 3, and groove 13 houses roller 6. Belleville spring 7 having elasticity is disposed between pressure nuts 9 and retainer 3. Nuts 9 are screwed into tapped holes 11 thereby spring 7 generates pressure force. The pressure force presses retainer 3 to urge roller 6 against sprocket 4. Then sprocket 4 is urged against flange 15 of sleeve 5.

Retainer 3 in a shape of hollow disc is held in accordance with a rotational direction of sleeve 5 by inserting key 10 into spline 14, so that retainer 3 rotates together with sleeve 5. Retainer 3 is also urged by belleville spring 7 in axial direction of the output shaft of motor 1. Retainer 3 reacts the pressure force of spring 7 and is able to move in axial direction toward motor 1, when spring 7 loads the excessive force over a given value. Sprocket 4 has holding groove 16 on its side face in an approximate and asymmetric V-shape, and groove 16 normally holds the roller 6 and faces to angular groove 13 of retainer 3.

Figure 2:
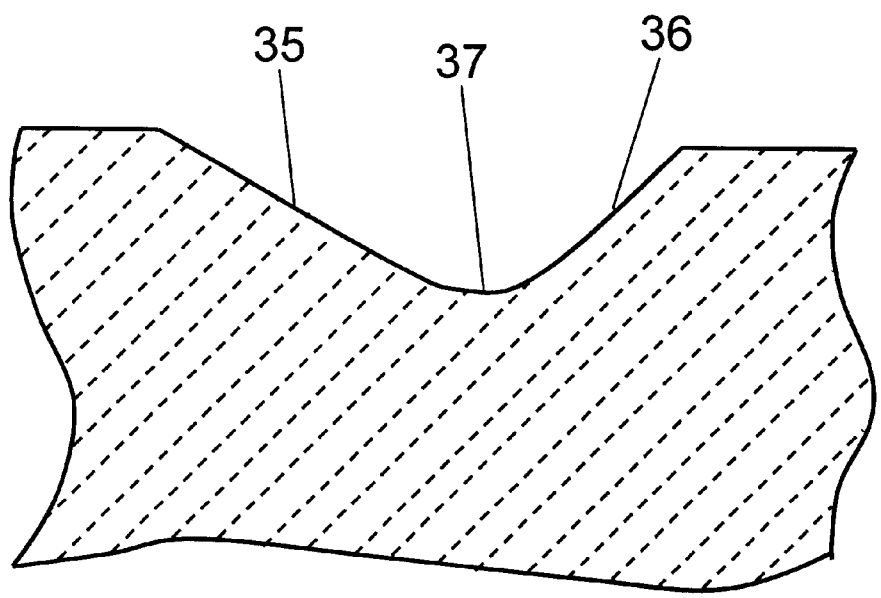
FIG. 2 is an enlarged cross sectional view of an approximate V-shaped groove in accordance with the first exemplary embodiment of the present invention.

FIG. 2 is an enlarged view of groove 16. Bottom 37 thereof has a curve having a larger radius than the radius of roller 6. A first slope 36 forms a larger angle than a second slope 35 does.

An operation of a torque transmitter in the first exemplary embodiment of the present invention is described hereinafter.

First, the rotation of output shaft 2 of motor 1 entails sleeve 5 fixed on shaft 2 by pin 8 to rotate. Then retainer 3 fixed to sleeve 5 by key 10 rotates. Roller 6 situated in angular groove 13 is urged by belleville spring 7 to V-shaped groove 16, thus roller 6 transfers the torque of retainer 3 side to sprocket 4 side, and retainer 3 rotates together with sprocket 4.

Second, when torque loaded to sprocket 4 exceeds a given threshold value, roller 6 situated in angular groove 13 reacts the pressure force of spring 7, rolls in V-shaped groove 16, then runs up onto, e.g. slope 35, and comes off V-shaped groove 16. At this moment, the torque generated by motor 1 stops being transmitted from retainer 3 to sprocket 4, in other words, the torque transmission is discontinued. The torque limiter thus functions. The threshold value of transmittable torque can be selectively varied depending on the pressure force of spring 7 and the shape of V-shaped groove 16 onto which roller 6 runs up, i.e. an angle of slope 35.

Further, when motor 1 rotates the other way around, excessive torque on sprocket 4 allows roller 6 to run up onto the other slope 36 of V-shaped groove 16 and come off groove 16. Because the angle of slope 36 is greater than that of slope 35, it needs greater torque for roller 6 to run up onto slope 36 and come off groove 16 than to run up onto slope 35. In other words, slope 36 requires greater threshold value of the transmittable torque than slope 35.

Respective desirable torque in different rotating directions can be thus obtained by selecting the pressure force of spring 7 and a shape of asymmetric V-shaped groove.

When the torque limiter functions, roller 6 comes off V-shaped groove 16 and idles. The torque on retainer 3 is thus not transmitted to sprocket 4, i.e. the torque transmission from the driver to the follower is discontinued. As a result, it is not seen in the present invention that unstable torque is kept on transmitting when a torque limiter functions as disclosed in the prior art U.S. Pat. No. 4,792,321.

The above description explains that the V-shaped groove is formed in sprocket 4. Alternatively, the V-shaped groove may be formed in retainer 3. Alternatively, grooves may be formed in both retainer 3 and sprocket 4 with portions of each groove having one or both of the side wall angles described above.

Also, the above description described spring 7. It is understood that spring 7 may be deleted if retainer 3 is made of a spring-like material.

(Exemplary Embodiment 2)

The second embodiment uses a different shape of V-shaped holding groove formed on sprocket 4 from that used in the first embodiment.

Figure 3:
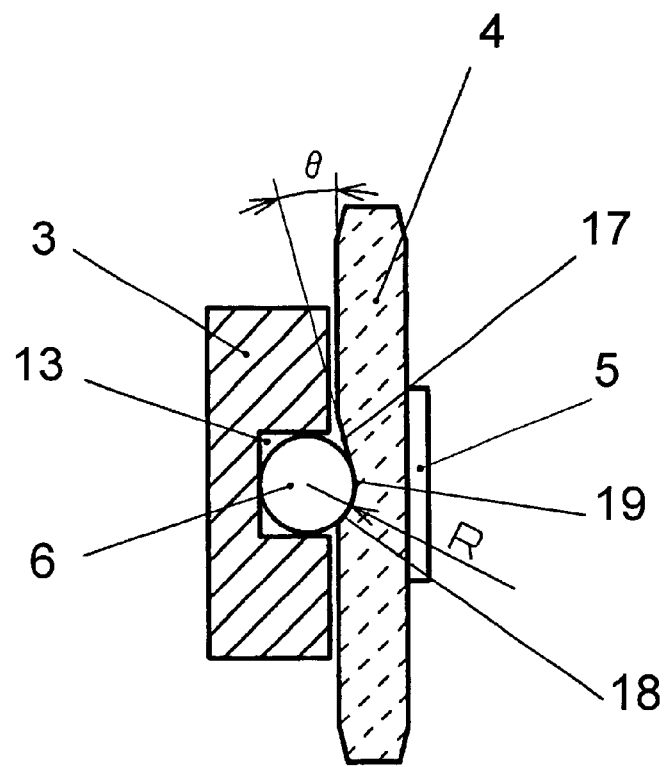
FIG. 3 illustrates an engagement of respective rotary bodies mounted on a driver side and a follower side in accordance with a second exemplary embodiment of the present invention.

In FIG. 3, an approximate V-shaped holding groove formed on sprocket 4 has following dimensions: depth: 1 mm, slope 17 of which slant angle θ is 15°, slope 18 is curved with radius of 3 mm, and bottom face 19 lying between slopes 17 and 18. As shown in FIG. 4A, three V-shaped grooves 16 are formed radially with 120° intervals. On retainer 3, three angular grooves 13 are formed radially at the places corresponding to V-shaped grooves 16. Grooves 13 have a depth of 4 mm and house respective cylindrical rollers 6 measuring 5.5 mm across rotatably. The other structures are the same as those of the first embodiment.

An operation of a torque transmitter having the structure discussed above is described hereinafter.

First, when the torque loaded to sprocket 4 is less than a given threshold torque, the operation is the same as that of the first embodiment.

Second, when the torque loaded to sprocket 4 exceeds the given threshold torque, rollers 6 situated in angular grooves 13 on retainer 3 react the pressure force of the belleville spring, roll in V-shaped grooves 16, run up onto, e.g. slope 17 and come off grooves 16. At this moment, the torque generated by motor 1 stops being transmitted from retainer 3 to sprocket 4. The torque limiter functions in this way. The threshold value of transmittable torque can be selectively varied depending on the pressure force of the belleville spring and the shape of V-shaped groove 16 onto which roller 6 runs up, i.e. an angle formed by slope 17.

Further, when motor 1 rotates the other way around, excessive torque on sprocket 4 allows roller 6 to run up onto curved face 18 on the other side of V-shaped groove 16 and come off groove 16. Because the angle of curved face 18 is greater than that of slope 17, it needs greater torque for roller 6 to run up onto curved face 18 and come off groove 16 than to run up onto slope 17. In other words, curved face 18 requires greater threshold value of the transmittable torque than slope 17. For instance, when slope 17 forms an angle of 15° and curved face 18 has a radius of 3 mm, curved face 18 requires three times torque for roller 6 to run up as much as roller 6 runs up slope 17.

Respective desirable torque in different rotating directions can be thus obtained by selecting the pressure force of the spring and a shape of asymmetric V-shaped groove 16.

(Exemplary Embodiment 3)

The third embodiment uses a different shape of V-shaped groove formed on sprocket 24 from that used in the second embodiment.

Figure 5A:
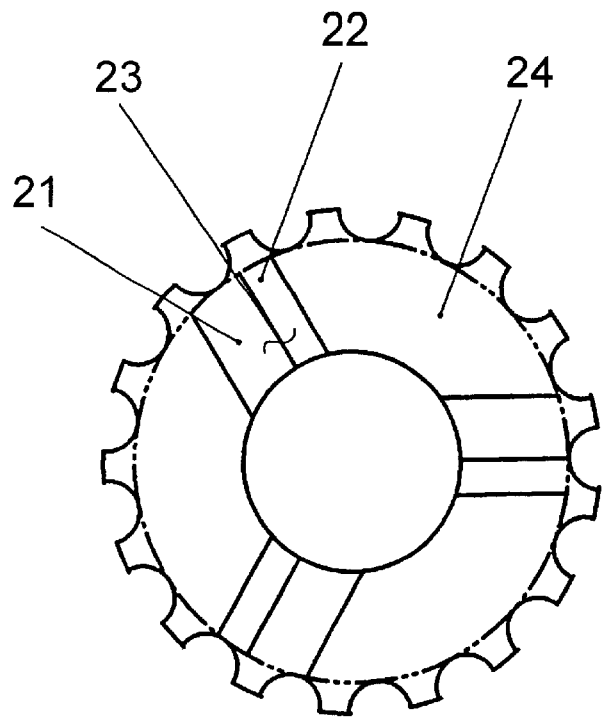
FIG. 5A is a plan view of the rotary body of the follower side in accordance with a third exemplary embodiment of the present invention.
Figure 5B:
FIG. 5B is a side view of the rotary body of the follower side in accordance with the third exemplary embodiment of the present invention.

As shown in FIG. 5A, V-shaped holding grooves are formed in this manner: slopes 22 having a greater slant angle are formed radially on sprocket 24, and slopes 21 having a smaller slant angle are formed in parallel with slopes 22. Curved face 23, i.e. a bottom section, connects both the slopes. Other structures remain the same as those of the second embodiment.

Table 1 shows measured threshold values of transmittable torque, i.e. limit torque values, when the pressure force of the belleville spring, and the combination of slant angle θ with curved face R are varied in embodiments 1 through 3.

TABLE 1

| | (unit: kgfcm) | | | |
|---|---|---|---|---|
| Pressure force of belleville spring | approximate V-shaped groove on the sprocket side | | | |
| | θ = 12° | θ = 15° | θ = 20° | Curved face R = 3 mm |
| 3 kgf | 3.2 | 3.5 | 3.9 | 8.1 |
| 6 kgf | 7.3 | 8.1 | 9.0 | 24.5 |
| 9 kgf | 10.3 | 12.1 | 13.1 | 35.5 |

As shown in table 1, respective desirable torque in different rotating directions can be thus obtained by selecting the pressure force of the spring and a shape of asymmetric V-shaped groove.

(Exemplary Embodiment 4)

Figure 6:
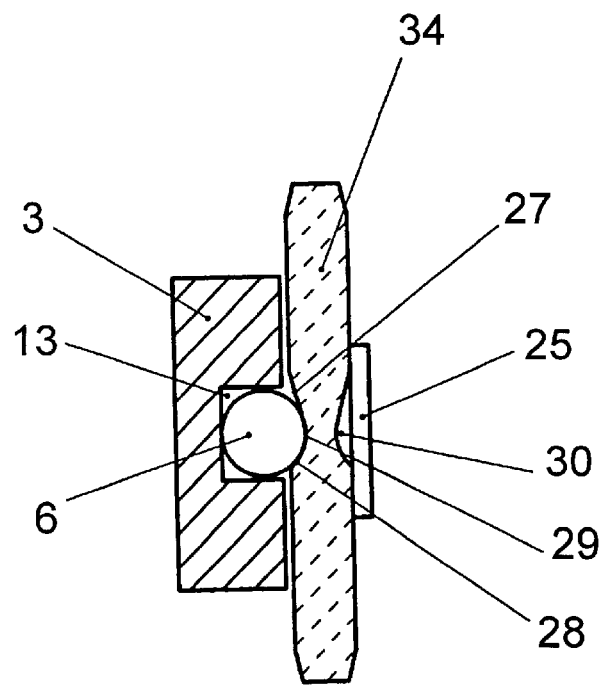
FIG. 6 illustrates an engagement of respective rotary bodies mounted on a driver side and a follower side in accordance with a fourth exemplary embodiment of the present invention.

The fourth embodiment differs from the embodiments 1 through 3 in the structure of approx. V-shaped grooves. As shown in FIG. 6, V-shaped holding grooves 29 and 30 having different slant angles are formed on both sides of sprocket 34 symmetrically. The rotating direction generates a difference between the values of limit torque, which has been proved in the embodiments 1 through 3, and this fact is also true in this fourth embodiment. Further, in this embodiment, the positional relation between slope 27 and curved face 28 can be reversed by turning over sprocket 34, so that the direction generating a difference of limit torque is reversed with ease.

V-shaped grooves 29 and 30 are provided symmetrically both in shape and location; however, in location wise, they may be asymmetric.

In the embodiments 1 through 4, the retainer is coupled with the output shaft of motor via the sleeve; however, the tapped hole and the spline can be provided on the output shaft so that the output shaft can be directly connected with the retainer.

Further in the embodiments 1 through 4, a rotary body on the follower side is a sprocket; however, the rotary body can be a pulley that rotates a V belt or a timing belt.

(Exemplary Embodiment 5)

Figure 7:
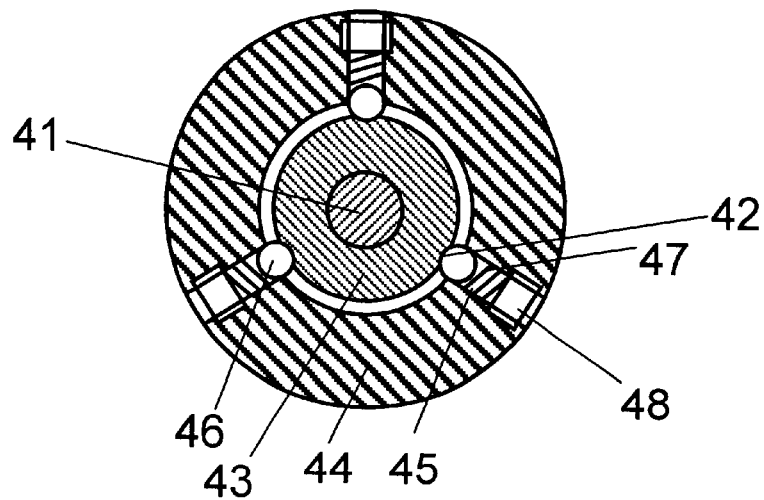
FIG. 7 illustrates an engagement of respective rotary bodies mounted on a driver side and a follower side in accordance with a fifth exemplary embodiment of the present invention.
Figure 8:
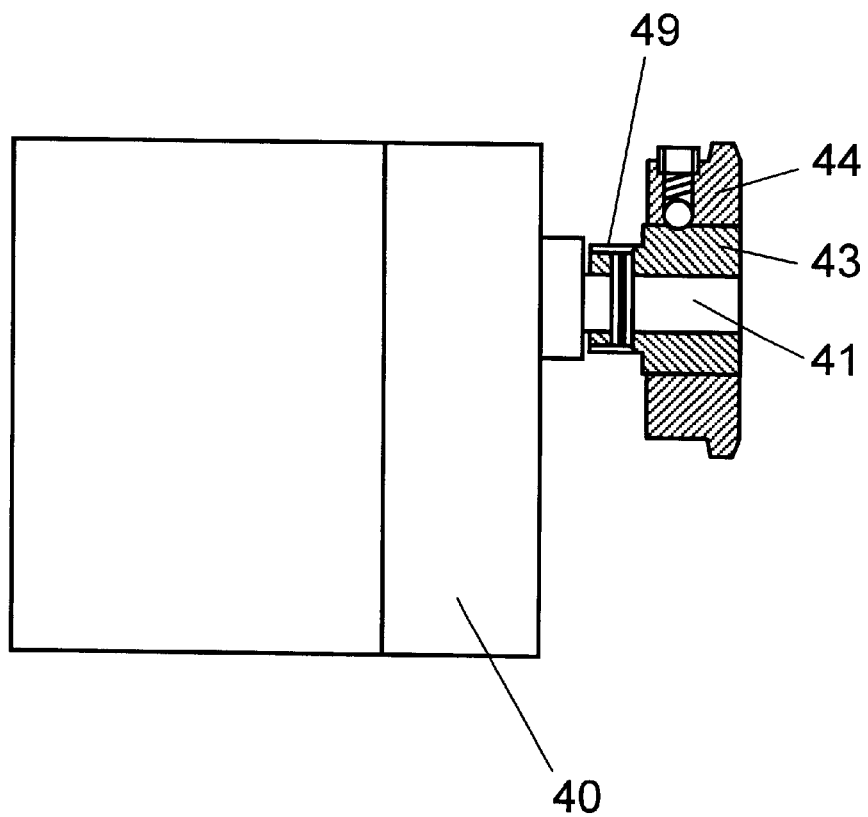
FIG. 8 is a cross sectional side view of an essential part of a torque transmitter in accordance with the fifth exemplary embodiment of the present invention.

In FIGS. 7 and 8, inner rotary body 43 is fixed by pin 49 on rotary shaft 41 that outputs torque of motor 40 having reduction gears as a driver. Outer rotary body 44 on a follower side, has a sprocket on its outer circumference. Shaft 41 journals outer rotary body 44 outside the inner rotary body 43. An angular groove 45 is formed on outer body 44 to hold ball 46. Inner body 43 has an asymmetric V-shaped holding groove 42 on its outer face corresponding to angular groove 45. Holding groove 42 normally holds ball 46. Angular groove 45 houses ball 46 and coil spring 47 which urges ball 46. Screw 48 can adjust the pressure force loaded to ball 46.

Figure 9:
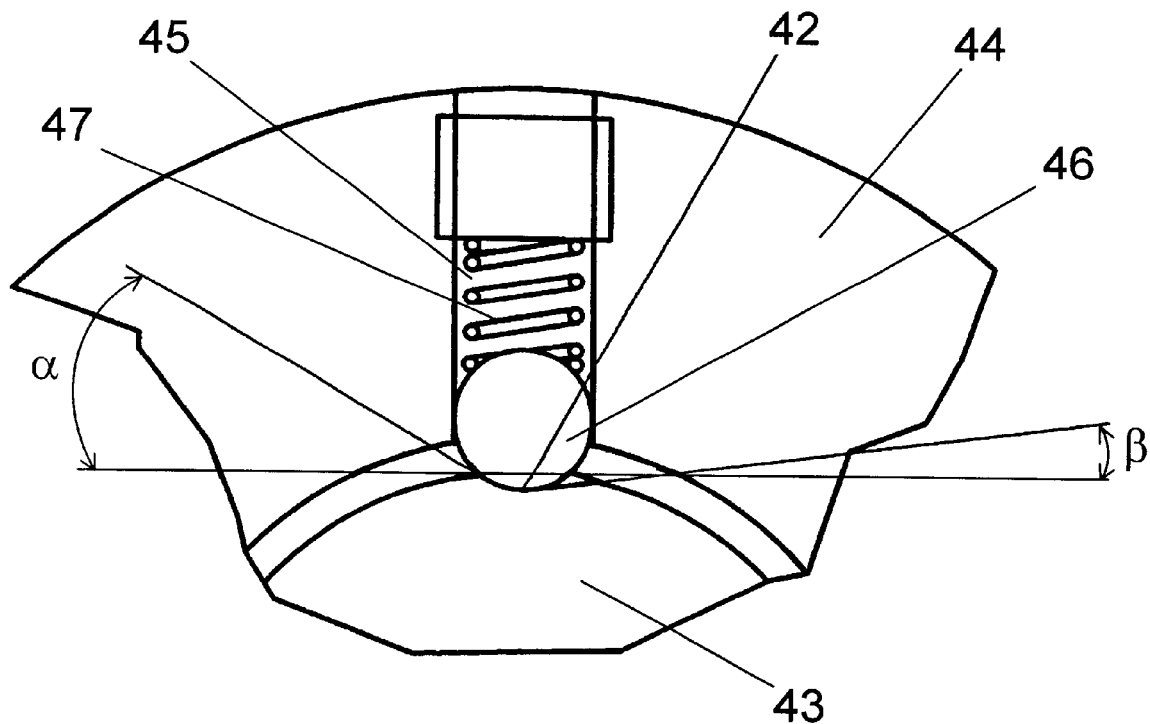
FIG. 9 is an enlarged cross sectional view illustrating the engagement of respective rotary bodies mounted on a driver side and a follower side in accordance with the fifth exemplary embodiment of the present invention.

As shown in FIG. 9, both the slopes of V-shaped groove 42 have different angles with regard to respective tangent lines of inner body 43, i.e. angleα is greater than angleβ.

Further in detail, inner rotary body 43 has three V-shaped grooves formed radially with 120° intervals, and the grooves have the following dimensions: depth: 1 mm, a first slope of which slant angle is 7.5°, a second slope is curved with radius of 2 mm. Outer rotary body 44 urges inner body 44 via ball 46 using the pressure force of spring 47. This construction allows inner body 43 to rotate together with outer body 44. When a torque over the pressure force of spring 47 is loaded onto outer body 44, ball 46 can move radially and outwardly.

An operation of the torque limiter having the construction discussed above is described hereinafter.

First, rotation of motor 40 entails inner rotary body 43 fixed by pin 49 on shaft 41 to rotate. Since ball 46 in angular groove 45 is urged by spring 47 to V-shaped holding groove 42 formed on outer face of inner rotary body 43, the rotation of inner body 43 naturally entails outer body 44 to rotate. As a result, the torque from the driver is transmitted to the follower.

Second, when the torque loaded to outer body 44 exceeds a given threshold value, ball 46 reacts the pressure force of spring 47 and rolls in V-shaped groove 42 to run up onto the slope. Ball 46 comes off the groove 42, then the torque transmission is discontinued, i.e. the torque limiter functions. In this case, the given threshold value is selectively determined depending on the pressure force of spring 47 and a shape of V-groove, namely, a slope angle and a radius of curved face.

When the motor rotates the other way around, ball 46 runs up onto the curved face opposite to the slope, and comes off groove 42. For instance, when the slope forms an angle of 15° and the curved face has a radius of 2 mm, the curved face requires three times torque for ball 46 to run up as much as ball 46 runs up the slope.

Different threshold values of torque can be thus set responsive to the rotating directions of outer rotary body 44 on the follower side.

(Exemplary Embodiment 6)

Figure 10:
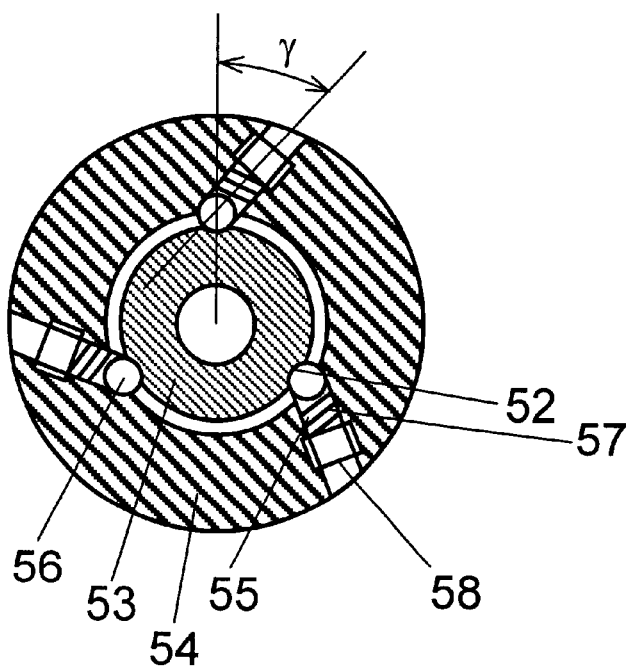
FIG. 10 illustrates an engagement of respective rotary bodies mounted on a driver side and a follower side in accordance with a sixth exemplary embodiment of the present invention.

The sixth embodiment differs from the embodiments 5 in the structure of an angular groove. As shown in FIG. 10, angular grooves 55 are formed having angley with regard to respective radial lines extending from the shaft center. This structure allows the limit torque to take different values responsive to rotating directions.

Outer rotary body 54 on the follower side is journaled by the rotary shaft and disposed outside the inner rotary body 53. An angular groove 55 is formed on outer body 54 to house ball 56. Inner body 53 has an asymmetric V-shaped groove 52 on its outer face corresponding to angular groove 55. Groove 52 normally holds ball 56. Angular groove 55 houses ball 56 and coil spring 57 that urges ball 56. Screw 58 can adjust the pressure force loaded to ball 56. Angular groove 55 is provided to form angley with regard to a line radially extending from the rotary center.

When the torque loaded to outer body 54 exceeds a given threshold value, ball 56 reacts the pressure force of spring 57 and rolls in V-shaped groove 52 to run up onto its slope. Ball 56 comes off the groove 52, then the torque transmission is discontinued, i.e. the torque limiter functions. In this case, frictional resistance of ball 56 takes different values responsive to the rotating directions, which results in different values of limit torque.

Both the slopes of V-shaped grooves do not necessarily take different slant angles. In the fifth and sixth embodiments, the rotary body on the follower side has the sprocket; however, instead of the sprocket the rotary body may have a pulley for a V-belt or a timing belt, or a shaft coupler for power transmission.

(Exemplary Embodiment 7)

Figure 11:
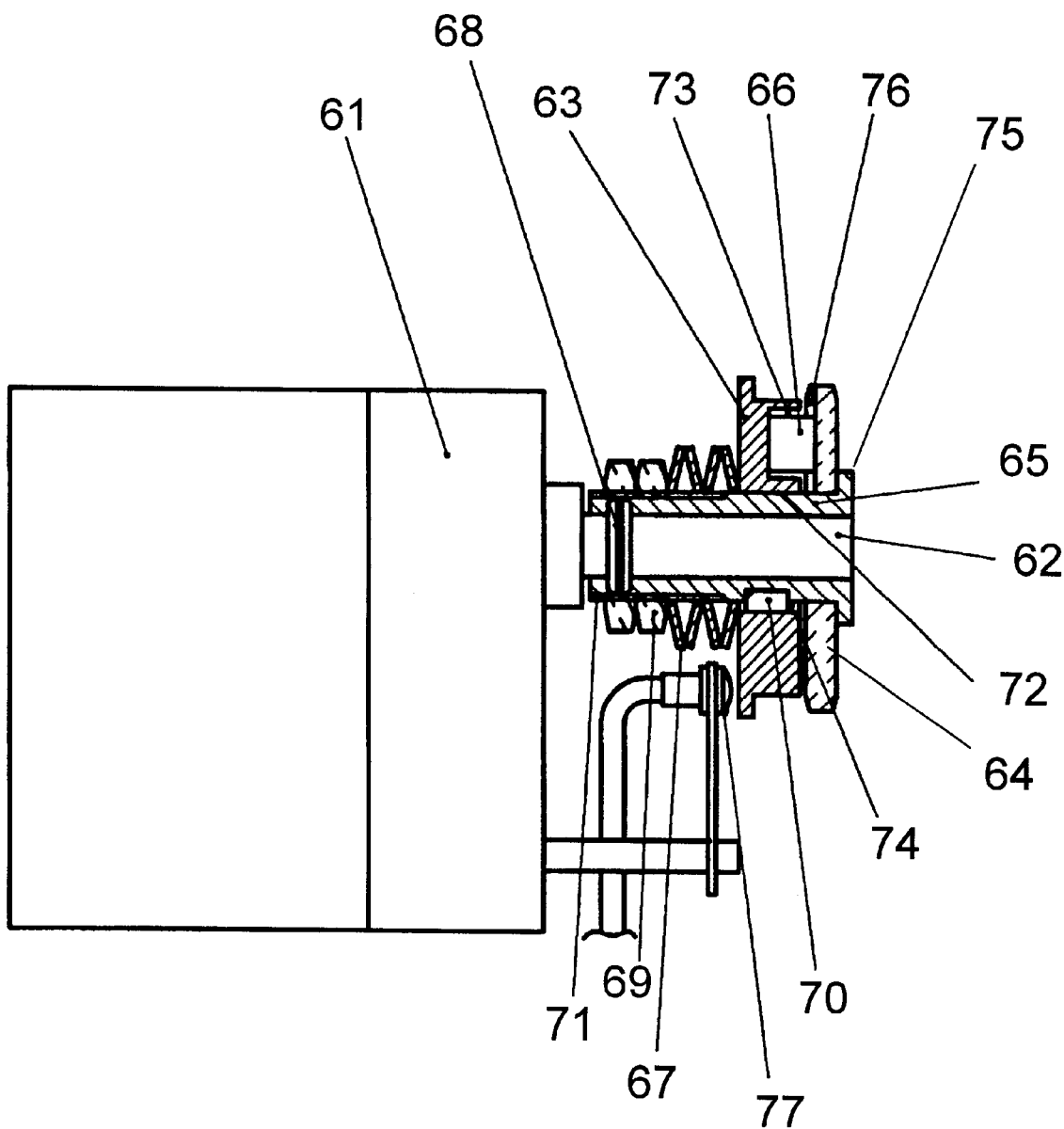
FIG. 11 is a cross sectional side view of an essential part of a torque transmitter in accordance with a seventh exemplary embodiment of the present invention.

In FIG. 11, sleeve 65 is fixed by pin 68 on output shaft 62 of motor 61 (driver) with reduction gears. Retainer 63 which is a rotary body of the driver side, and sprocket 64 which is a rotary body on the follower side are mounted on a cylindrical section 72 of sleeve 65. Angular groove 73 is formed on retainer 63, and groove 73 receives roller 66.

Belleville spring 67 having elasticity is disposed between pressure nuts 69 and retainer 63. Nuts 69 are screwed onto threaded section 71 on sleeve 65, thereby spring 67 generates pressure force. The pressure force presses retainer 63 to urge roller 66 against sprocket 64. Then sprocket 64 is urged to flange 75 of sleeve 65.

Retainer 63 in a shape of hollow disc is held in a rotating direction of sleeve 65 by inserting key 70 into spline 74, so that retainer 63 rotates together with sleeve 65. Retainer 63 is also urged by belleville spring 67 in axial direction of the output shaft of motor 61. Retainer 63 reacts the pressure force of spring 67 and is able to move in axial direction toward motor 61 when spring 67 is imposed by the force over a given value. Sprocket 64 has an approximate and asymmetric V-shaped groove 76 on its side face in, and groove 76 normally holds roller 66 and faces to angular groove 73 of retainer 63.

Switch 77 is mounted to motor 61 to be adjacent to retainer 63 so that switch 77 can work when retainer 63 moves axially by the excessive torque over given threshold value loaded to sprocket 64. Switch 77 is a "NC" (normally closed) switch, and can be made of piezoelectric elements.

An operation of the torque limiter having the structure discussed above is described hereinafter.

First, the rotation of output shaft 62 of motor 61 entails sleeve 65 fixed on shaft 62 by pin 68 to rotate. Then retainer 33 fixed to sleeve 65 by key 70 rotates. Roller 66 situated in angular groove 73 is urged by belleville spring 67 to V-shaped groove 76, thus roller 66 transfers the torque of retainer 63 to sprocket 64, and retainer 63 rotates together with sprocket 64.

Second, when torque loaded to sprocket 64 exceeds a given threshold value, roller 66 situated in angular groove 73 reacts the pressure force of spring 67, rolls in V-shaped groove 76, then runs up onto a slope, and comes off V-shaped groove 76. At this moment, the torque generated by motor 61 stops being transmitted from retainer 63 to sprocket 64, in other words, the torque transmission is discontinued. The torque limiter functions in this way. The threshold value of transmittable torque can be selectively varied depending on the pressure force of spring 67 and the shape of V-shaped groove onto which roller 66 runs up, i.e. an angle of the slope.

Switch 77 is closely placed to retainer 63 with clearance of 0.5–1 mm in axial direction on the condition that the torque limiter does not function. When the torque limiter functions, retainer 63 moves axially and push switch 77 to open.

A breaking circuit including switch 77 is described with reference to FIG. 12. The breaking circuit has the following construction.

Figure 12:
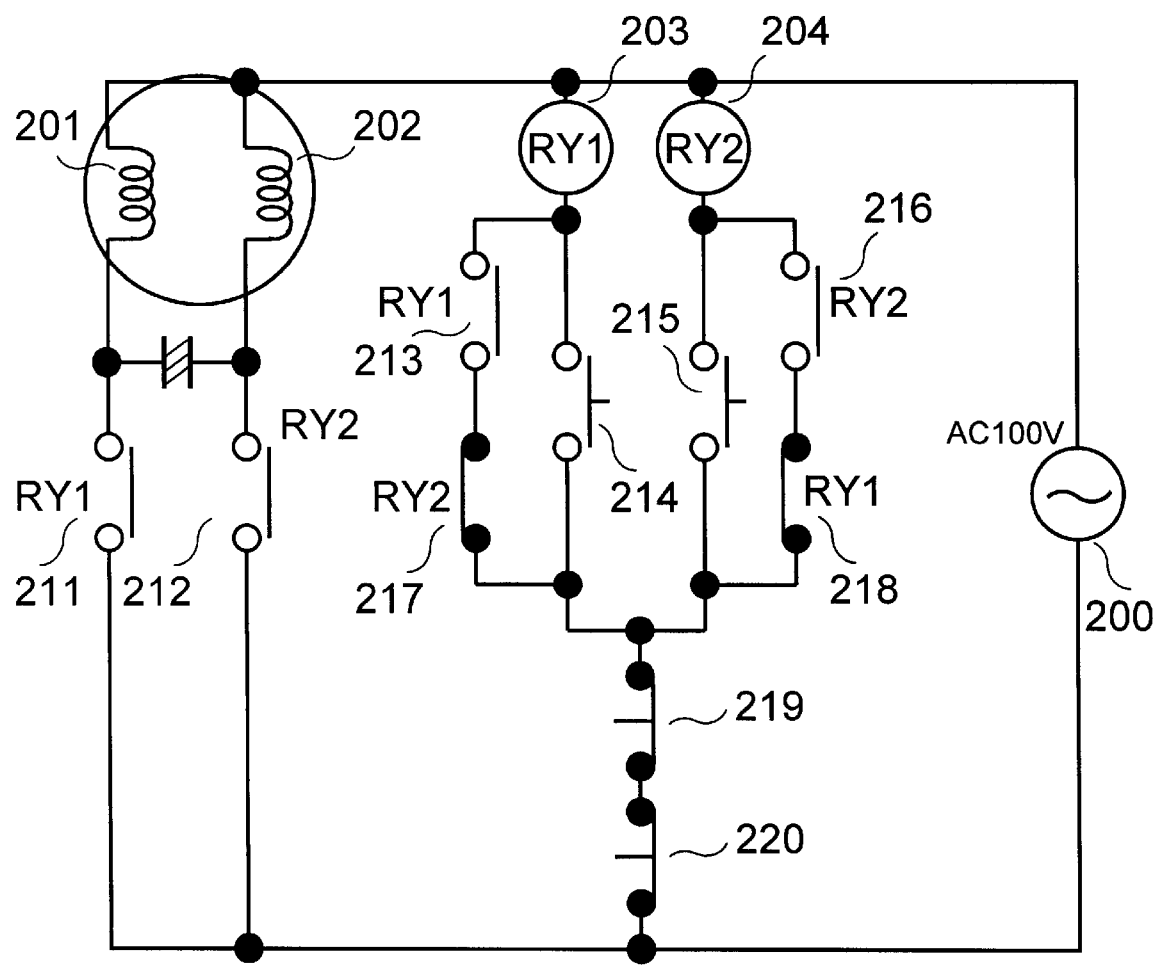
FIG. 12 is a cut-off circuit diagram in accordance with the seventh exemplary embodiment of the present invention.

In FIG. 12, a first end of motor coil 201 for spinning the motor clockwise is connected to a first end of motor coil 202 for spinning the motor counter clockwise. The contact point of these coils is connected to a first end of commercial power supply 200. Between the contact point and a second end of commercial power supply 200, coil 203 of relay RY1, NO switch 214 (normally open) for spinning the motor clockwise, NC switch 219 for breaking current to stop the motor at an emergency, and NC switch 220 corresponding to switch 77 shown in FIG. 11, are connected in series. Between the contact point and the second end of the commercial power supply 200, coil 204 of relay RY2, NO switch 215 for counter clockwise spin, stop switch 219, and switch 220 are connected in series.

Relay RY1 comprises NO switches 211, 213 and NC switch 218. Powering coil 203 activates switches 211, 213 and 218. Relay RY2 comprises NO switches 212, 216 and NC switch 217. Powering coil 204 activates those switches. A second end of motor coil 201 is coupled to the second end of commercial power supply 200 via switch 211, and a second end of motor coil 202 is coupled to the second end of commercial power supply 200 via switch 212. Between both the terminals of switch 214, switches 213 and 217 are connected in series. Between both the terminals of switch 215, switches 216 and 218 are connected in series. A capacitor is connected between the second end of coil 201 and the second end of coil 202.

An operation of the breaking circuit having the construction discussed above is described hereinafter.

First, select and push switch 214 to power coil 203 of relay RY1, which activates switches 211, 213 and 218. Then NO switch 213 closes, and NC switch 217 remains closed because it is not activated. The voltage of commercial power supply 200 is thus applied to relay RY1, and current keeps running through coil 203, thereby constructing a self-holding circuit of relay RY1. At the same time, NO switch 211 of relay RY1 closes, and motor coil 201 is powered, so that the motor spins clockwise. Also at the same time, NC switch 218 of relay RY1 opens so that the voltage of power supply 200 is not applied to relay RY2.

On the contrary to the above operation, select and push switch 215 to power coil 204 of relay RY2, which activates switches 212, 216 and 217. Then NO switch 216 of relay RY2 closes, and NC switch 218 remains closed because it is not activated. The voltage of commercial power supply 200 is thus applied to relay RY2, and current keeps running through coil 204, thereby constructing a self-holding circuit of RY2. At the same time, NO switch 212 of relay RY2 closes, and motor coil 202 is powered, so that the motor spins counter clockwise. Also at the same time, NC switch 217 of relay RY2 opens so that the voltage of power supply 200 is not applied to relay RY1.

During the motor rotation in clockwise direction, when the torque limiter functions and the retainer moves axially to press switch 220, NC switch 220 opens, thereby breaking the self-holding circuit of relay RY1 and opening NO switch 211. As a result, current to motor coil 201 is cut off and the motor stops. In the case when the motor spins counter clockwise, the torque limiter functions and the retainer moves axially to push switch 220. The current to motor coil 202 is cut off in the same manner, and the motor stops.

Pressing stop-switch 219 also breaks the self-holding circuits of relays RY1 and RY2, thereby opening switches 211 and 212. As a result, the current to the motor is cut off, and the motor stops. When restoring the motor, press switch 214 or 215 to work either one of self-holding circuit of relay RY1 or RY2. Then the motor spins clockwise or counter clockwise accordingly.

(Exemplary embodiment 8)

Figure 13:
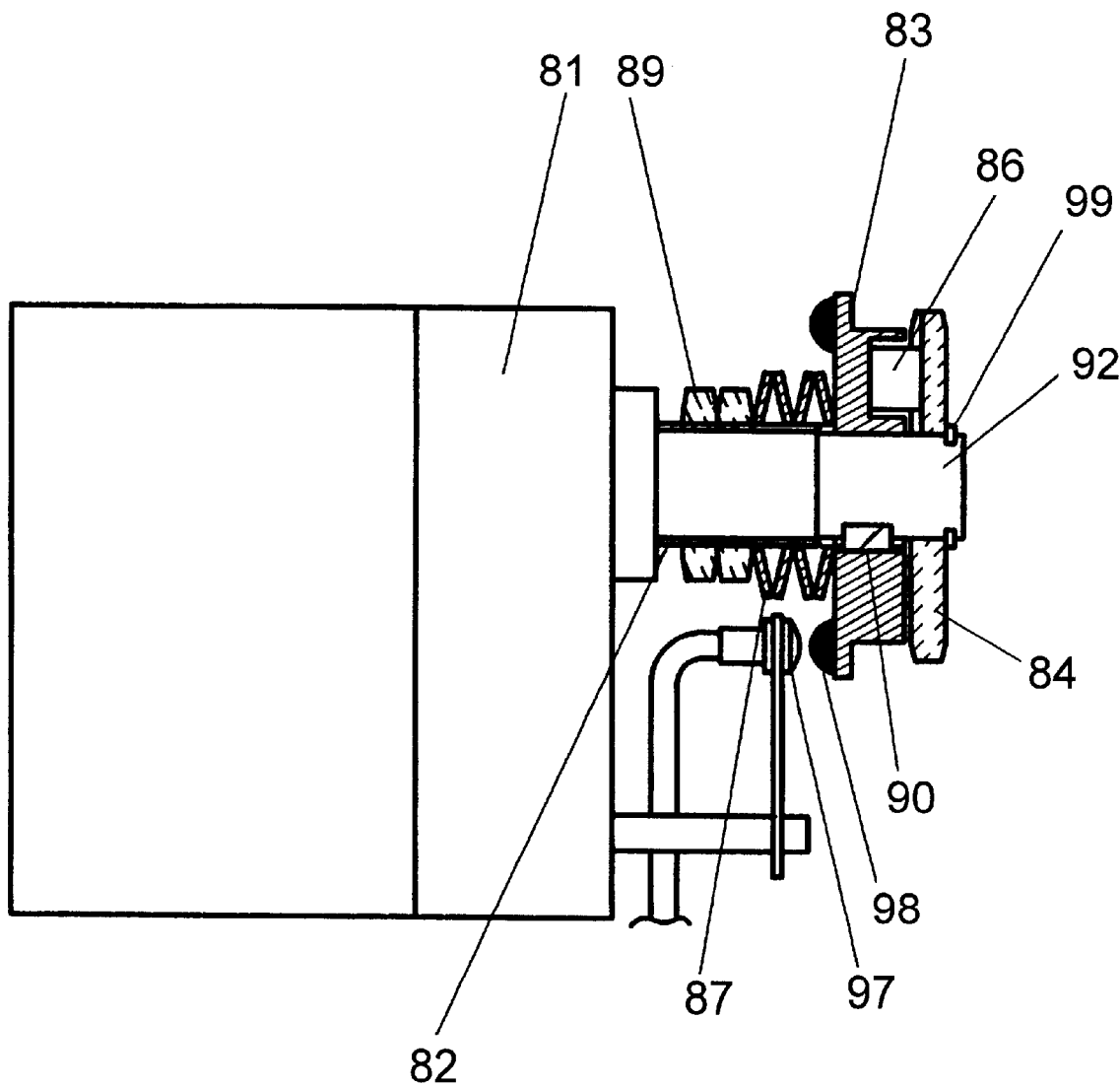
FIG. 13 is a cross sectional side view of an essential part of a torque transmitter in accordance with an eighth exemplary embodiment of the present invention.

In FIG. 13, threaded section 82 is formed on output shaft 92 of motor 81 (driver) having reduction gears. Pressure nut 89 is screwed into threaded section 82. Belleville spring 87, an elastic body, is disposed between pressure nut 89 and retainer 83 which is a rotary body of the driver side. Sprocket 84 which is a rotary body on the follower side is urged by the pressure force of spring 87 to flange 99 via retainer 83 and roller 86 housed in the angular groove on retainer 83.

Retainer 83 in a shape of hollow disc is held in a rotating direction of shaft 92 by inserting key 90 into a spline, so that retainer 83 rotates together with shaft 92. Retainer 83 is also urged by belleville spring 87 in axial direction. Retainer 83 reacts the pressure force of spring 87 and is able to move in axial direction toward motor 81 when spring 87 is loaded by the force over a given value. Sprocket 84 has an approximate and asymmetric V-shaped groove on its side face. Switch 97 is mounted to motor 81 to be adjacent to retainer 83 so that switch 97 can work when retainer 83 moves axially by the excessive torque over a given threshold value loaded to sprocket 84. Switch 97 is a "NC" (normally closed) switch, and can be made of piezoelectric elements. Particularly in this eighth embodiment, protrusions 98 are formed on octant positions of retainer 83 so that protrusion 98 can contact switch 97. This arrangement allows switch 97 to open/close instantaneously free from errors.

(Exemplary Embodiment 9)

Figure 14:
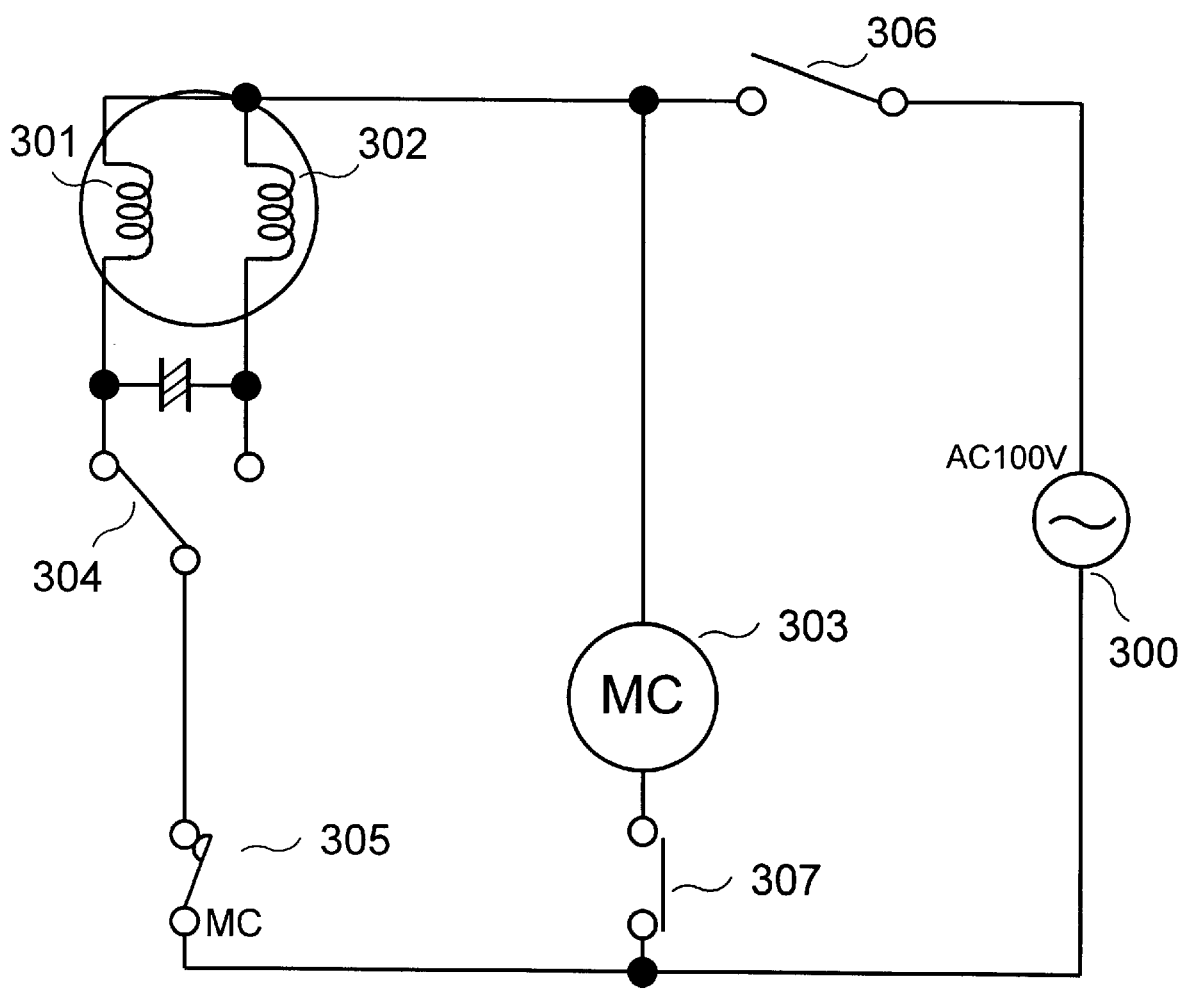
FIG. 14 is a cut-off circuit diagram in accordance with a ninth exemplary embodiment of the present invention.

The ninth embodiment handles a torque transmitter including another breaking circuit shown in FIG. 14.

In FIG. 14, a first end of motor coil 301 which spins the motor clockwise is connected to a first end of motor coil 302 which spins the motor counter clockwise. The contact point of these motor coils is coupled to a first end of commercial power supply 300 via motor-starter-switch 306. Respective second ends of motor coils 301 and 302 are coupled to a second end of commercial power supply 300 via switch 304 which switches a rotating direction, and NC (normally closed) switch 305 that is activated when breaker coil 303 is powered. Between the contact point of the motor coils and the second end of commercial power supply 300, breaker coil 303 and NO (normally open) switch 307 are connected in series. Switch 307 is disposed adjacently to a retainer and is activated when a rotary body on a driver side is moved axially with limit torque. A capacitor is connected across the respective second ends of motor coils 301 and 302.

An operation of the breaking circuit discussed above is described hereinafter.

Assume that switch 304 is coupled to motor coil 301. The torque limiter does not function yet, and NC switch 305 is closed. In this situation, close switch 306, and apply a voltage of power supply 300 to motor coil 301. Then, motor spins clockwise. On this condition, when excessive torque over a threshold value is loaded to the rotary body on the follower side, NO switch 307 is closed. Then breaker coil 303 is powered, which entails NC switch 305 to open, and the current running through motor coil 301 is cut off. As a result, the motor stops. When switch 304 is coupled to motor coil 302, the motor spins counter clockwise. In this case, the breaking circuit works in the same manner as discussed above.

(Exemplary Embodiment 10)

Figure 15:
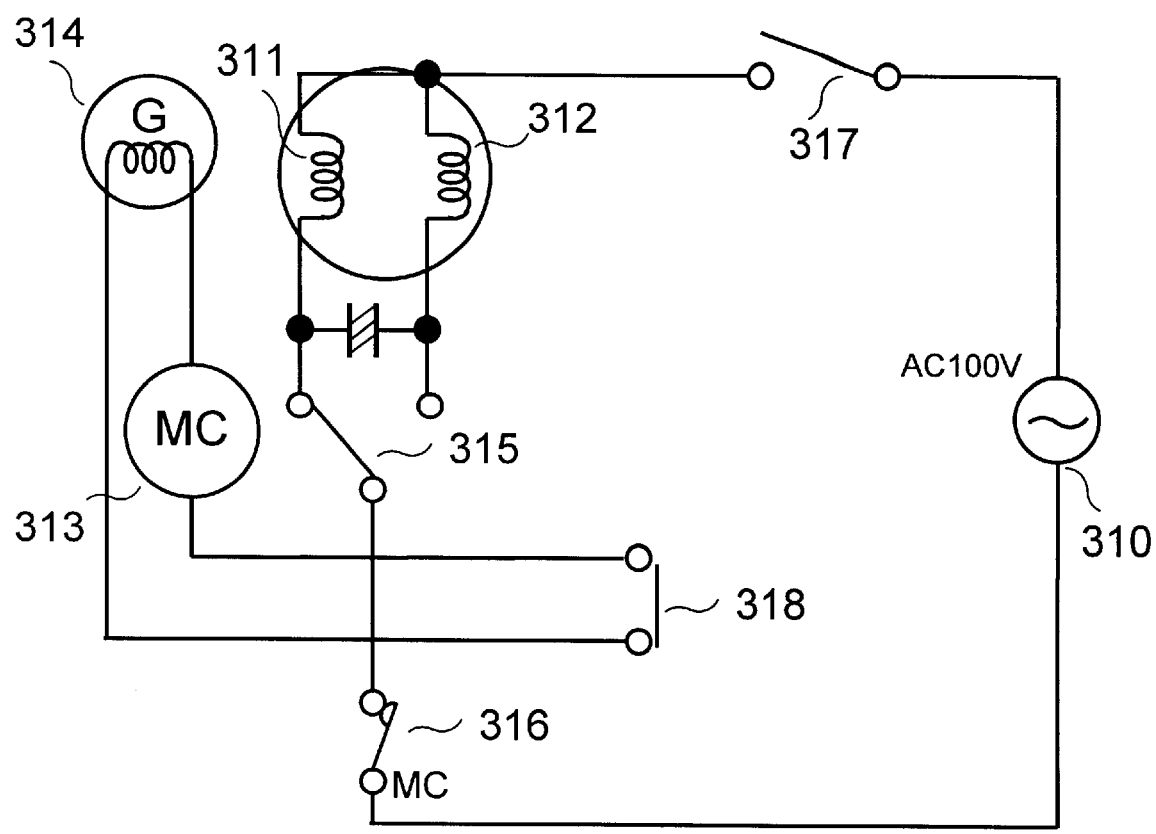
FIG. 15 is a cut-off circuit diagram in accordance with a tenth exemplary embodiment of the present invention.

The tenth embodiment handles a torque transmitter including still another breaking circuit shown in FIG. 15.

In FIG. 15, a first end of motor coil 311 which spins the motor clockwise is connected to a first end of motor coil 312 which spins the motor counter clockwise. The contact point of these motor coils is coupled to a first end of commercial power supply 310 via motor-starter-switch 317. Respective second ends of motor coils 311 and 312 are coupled to a second end of commercial power supply 310 via switch 315 which switches a rotating direction and NC (normally closed) switch 316 that is activated when breaker coil 313 is powered.

A stator of the motor has supplemental coils, and a power generator 314 is formed which generates voltages on the supplemental coils by spinning a rotor of the motor. A first end of power generator 314 is Coupled to a second end thereof via breaker coil 313 and NO (normally open) switch 318 that is activated when the rotary body on a driver side moves axially with limit torque. A capacitor is connected across the respective second ends of motor coils 311 and 312.

An operation of the breaking circuit discussed above is described hereinafter.

Assume that switch 315 is coupled to motor coil 311. The torque limiter does not function yet, and NC switch 316 is closed. In this situation, close switch 317, and apply a voltage of power supply 310 to motor coil 311. Then, the motor spins clockwise. The power generator 314 generates power responsive to the spin; however, NO switch 318 is not activated yet and remains open, thus breaker coil 313 is not powered.

On this condition, when excessive torque over a threshold value is loaded to the rotary body on the follower side, NO switch 318 is closed. Then generator 314 powers breaker coil 313, which entails NC switch 316 to open, and the current running through motor coil 311 is cut off. As a result, the motor stops. When switch 315 is coupled to motor coil 312, the motor spins counter clockwise. In this case, the breaking circuit works in the same manner as discussed above.

Figure 16:
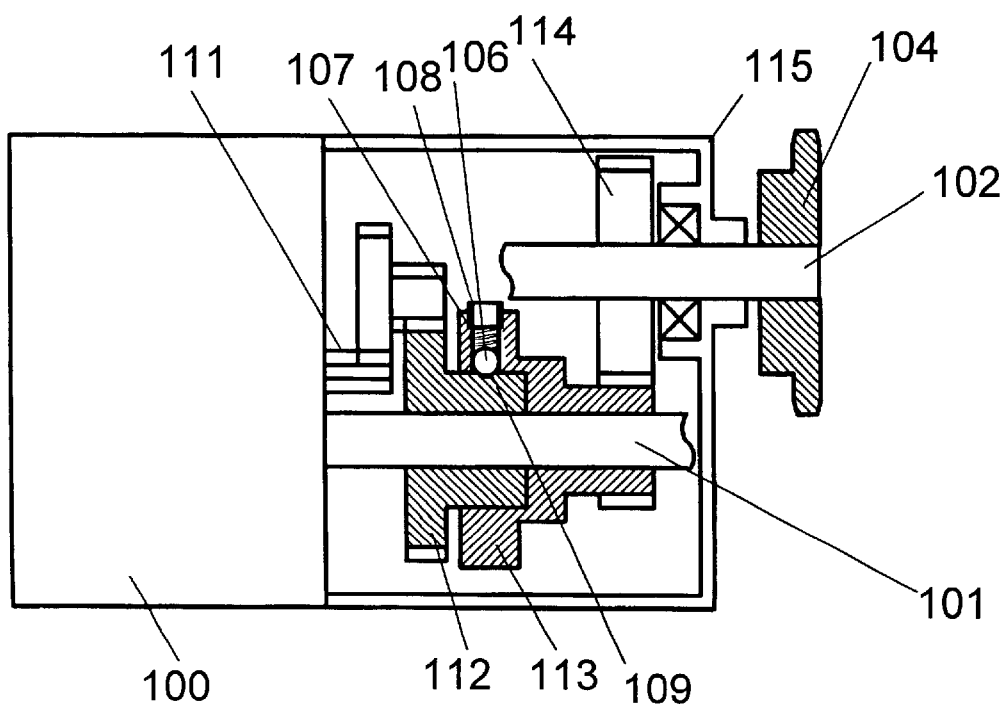
FIG. 16 is a cross sectional side view of an essential part of a torque transmitter in accordance with an eleventh exemplary embodiment of the present invention.

(Exemplary Embodiment 11) The 11th embodiment handles a torque limiter built in a gear section of reduction gears. In FIG. 16, Shaft 111, on which gears are formed, outputs the torque generated by motor 100 into gear section 115, and the torque is transmitted via a plurality of gears to inner rotary body 112 having gears on its outer rim. Rotatable shaft 101 extends through the center of inner rotary body 112 and is fixed in body 112. Outer rotary body 113 is disposed outside the inner body 112.

On outer rotary body 113, an angular groove is formed. The groove houses ball 106 and spring 107 that urges the ball. Pressure force of spring 107 can be varied by adjusting the fastening force of screw 108. Asymmetric V-shaped groove 109 is formed on the outer rim of inner body 112 so that groove 109 can face the angular groove.

The torque traveled from inner body 112 is transmitted to outer body 113 via ball 106 urged by spring 107. The torque is further transmitted to output gear 114 via a pinion gear provided at the end of outer body 113. The torque is finally transmitted to the follower side via output shaft 102 fixed to gear 114 and sprocket 104 fixed to shaft 102.

When excessive torque over a given threshold value is loaded to sprocket 104, torque of a reciprocal value of reduction ratio of the pinion gear to output gear 114 is loaded to the torque limiter. Then ball 106 reacts the pressure force of spring 107, and pushes spring 107 outwardly. Ball 106 comes off V-shaped groove 109, and the torque transmission is discontinued. By forming both the slopes of V-shaped groove 109 in different angles, the limit torque can be changed depending on the rotating direction of sprocket 104.

(Exemplary Embodiment 12)

The 12th embodiment handles an improvement of the first embodiment. A problem still remaining in the first embodiment is discussed hereinafter first.

The construction of the torque limiter used in the first exemplary embodiment is as follows: The angular groove formed on the rotary body of the driver side houses the roller, which engages with the V-shaped groove formed on the rotary body of the follower side. When excessive torque over the threshold value is loaded to the rotary body on the follower side, the rotary body on the driver side reacts the pressure force of elastic body and moves axially, and then the roller comes off the V-shaped groove. As a result, torque transmission is discontinued. In this construction, since the roller is housed by the angular groove provided on the rotary body of driver side, the roller is subjected to both the pressure force from the elastic body and the force driving the follower. The roller thus won't roll but just revolves together with the driver and follower sides by friction during the torque transmission. A way of usage may shorten the service life, or make the limit-torque-value unstable.

When the torque limiter used in the first embodiment is employed in an electric shutter, it can be used for detecting an obstacle because it does not function so frequently in such an application; however, it will not endure frequent use because of its service life. The twelfth embodiment addresses this problem, and aims to provide a torque limiter having a long service life and a more stable limit torque value than that used in the first embodiment.

Figure 17:
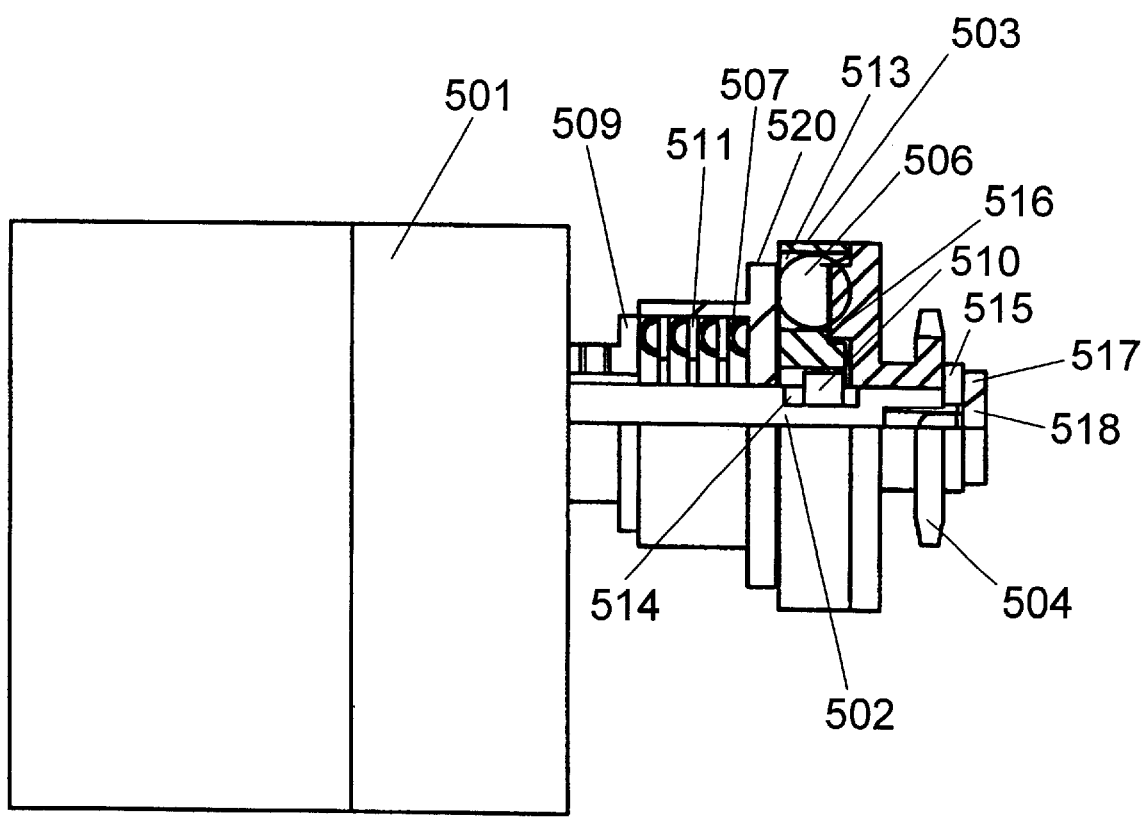
FIG. 17 is a cross sectional side view of an essential part of a torque transmitter in accordance with a twelfth exemplary embodiment of the present invention.

FIG. 17 is a cross sectional view of essential part of a torque limiter in accordance with the twelfth embodiment.

In FIG. 17, spline 514 is formed on output shaft 502 of motor 501 (driver) having reduction gears, and key 510 is inserted into spline 514 so that rotary body 503 on the driver's side is fixed. Hole 513 is formed on rotary body 503, and hole 513 holds steel ball 506 as a roller. Steel ball 506 is sandwiched by rolling panel 520 and rotary body 504 on a follower side. Rotary body 504 is a hollow disc and has asymmetric protrusions 516 which hold steel balls 506. Protrusions 516 has different angles formed by its respective slopes. Rolling panel 520 urges steel ball 506 with spring 507 that is pressed by fastening pressure nut 509. Rotary body 504 on the follower side is fixed axially by collar 515, snap ring 517 and screw 518. The pressure force of rolling panel 520 is transmitted to rotary body 504 via steel ball 506. Spring 507 is made of a plurality of wave washers, and an elastic body pressing the rolling panel 520 employs spring 507 and flat washers 511, where wave washers and flat washers are alternately arranged. The elastic body can be a single wave washer or a coil spring instead of combination of wave washers and flat washers.

FIG. 18A is a plan view of rotary body 504 on the follower side used in the twelfth embodiment. FIG. 18B is a front view of the same, and FIG. 18C is a right side view of the same. FIG. 18D is an enlarged cross section of protrusion 516 provided on rotary body 504.

As shown in FIG. 18D, rotary body 504 has protrusions 516 as a holding section, which comprise ridge 539, slope 540 on the left hand of ridge 539, and slope 541 on the right hand of ridge 539. Slope 540 forms angleθ and slope 541 forms angleα, angleα is greater than angleθ.

An operation of the torque limiter constructed as above is described hereinafter.

In FIG. 17, first, rotate output shaft 502 of motor 501, then the torque is transmitted to rotary body 503 on the driver side via key 510, and rotary body 503 rotates. Steel ball 506 held in hole 513 of rotary body 503 is urged by spring 507, so that it engages with protrusion 516 formed on a side face of rotary body 504 of the follower side. The torque is thus transmitted to the follower side. Rotary body 503 of the driver side rotates together with rotary body 504 of the follower side.

When excessive torque over a given threshold value is loaded to rotary body 504 on the follower side, steel ball 506 in hole 513 reacts the pressure force of spring 507 and rolls around protrusion 516. For instance, steel ball 506 runs up onto slope 540 and comes off ridge 539. At this moment, the torque generated by motor 501 is discontinued being transmitted from rotary body 503 on the driver side to rotary body 504 on the follower side. In other words, the torque transmission is stopped. The torque limiter functions in this way. The transmittable limit-torque-value can be selectively determined depending on the pressure force of spring 507 and a shape of protrusion 516, i.e. the angle formed by slope 540.

When motor 501 spins the other way around, excessive torque to rotary body 504 on the follower side allows steel body 506 to run up slope 541 and come off ridge 539. Since the angle formed by slope 541 is greater than that by slope 540, slope 541 requires greater torque for steel ball 506 to come off ridge 539 than slope 540 does. In other words, slope 541 needs a greater limit torque value.

Respective desirable torque in different rotating directions can be thus obtained by selecting the pressure force of the spring 507 and a shape of protrusion 516, i.e. angles of both the slopes.

The twelfth embodiment proves that different limit torque values depending on rotating directions can be obtained in a simple construction of the torque limiter, which assures a long service life and stable torque.

(Exemplary Embodiment 13)

Figure 19:
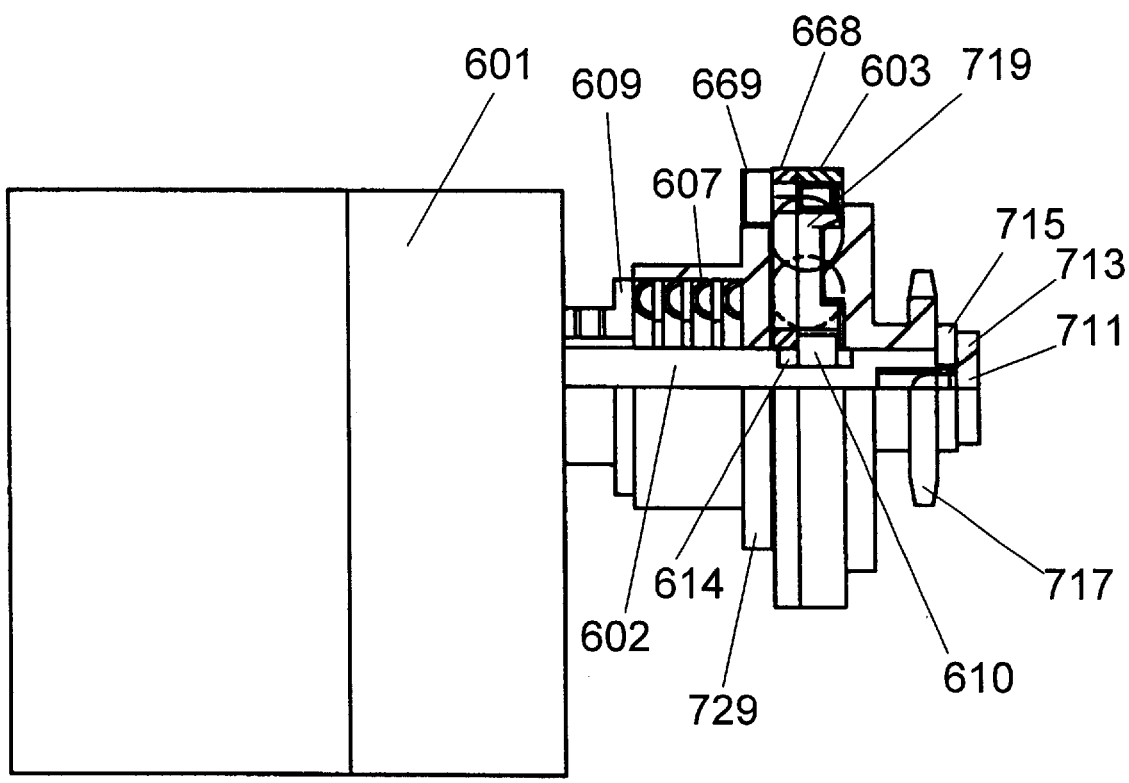
FIG. 19 is a cross sectional view illustrating the engagement of a rotary body mounted on a driver side, a roller and a rotary body mounted on a follower side in accordance with a thirteenth exemplary embodiment of the present invention.

The 13th embodiment handles an improvement of the first embodiment as discussed in the 12th embodiment. FIG. 19 is a cross sectional view illustrating the engagement of a rotary body mounted on a driver side, a roller and a rotary body mounted on a follower side in accordance with the 13th embodiment, and FIG. 20 is an exploded perspective view illustrating the engagement of the same.

Figure 20:
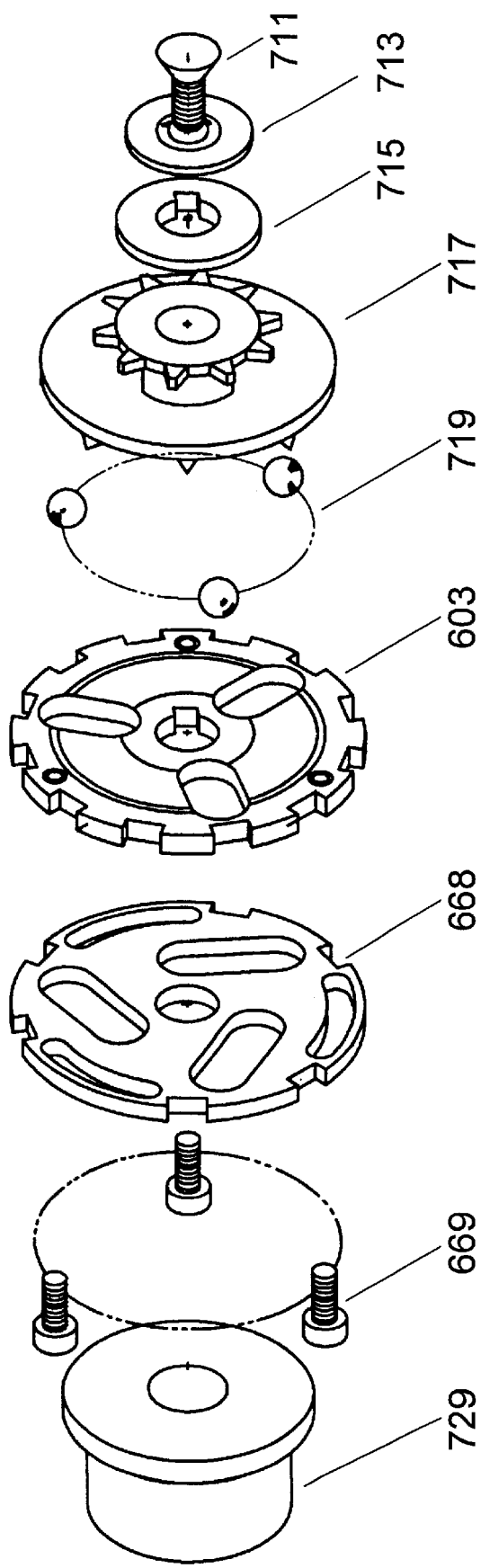
FIG. 20 is an exploded perspective view illustrating the engagement of the rotary body mounted on the driver side, the roller and the rotary body on the follower side in accordance with the thirteenth exemplary embodiment of the present invention.

In FIGS. 19 and 20, spline 614 is formed on output shaft 602 of motor 601 (driver) having reduction gears, and key 610 is inserted into spline 614 so that rotary body 603 on the driver side is fixed to output shaft 602. Rotary body 603 integrates position-adjustment-holder 668 with screw 669. Long holes are provided on both holder 668 and rotary body 603, and steel ball 719 is held in the overlapping section of respective long holes. Steel ball 719 is sandwiched by rolling panel 729 and rotary body 717 of the follower side. Rotary body 717 is a hollow disc and has asymmetric protrusions as holding sections at the places corresponding to steel ball 719. Rolling board 729 urges steel ball 719 with spring 607 that is pressed by fastening pressure nut 609. Rotary body 717 on the follower side is fixed axially by collar 715, snap ring 713 and screw 711. The pressure force of rolling panel 729 is transmitted to rotary body 717 via steel ball 719.

In this 13th embodiment, the shape of holes on rotary body 603 of driver side is changed, and position-adjustment-holder 668 is newly added. These two points are different from the 12th embodiment.

Figure 21A:
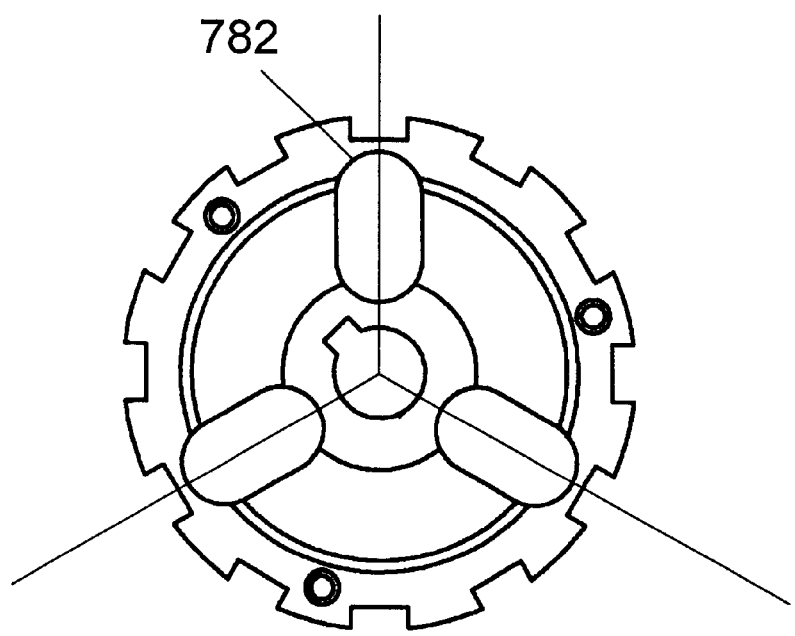
FIG. 21A is a plan view of the rotary body on the driver side in accordance with the thirteenth exemplary embodiment of the present invention.
Figure 21B:
FIG. 21B is a side view of the rotary body on the driver side in accordance with the thirteenth exemplary embodiment of the present invention.

As shown in FIG. 21A, three long holes 782 for holding ball 719 are provided on rotary body 603 radially at 120° intervals. As shown in FIG. 22A, long holes 786 are provided on holder 668 forming angles with regard to radial lines from the center. Long holes 787 through which screws 669 extend are also provided on holder 668. Rotary body 603 and holder 668 are laid up on top another after respective angles in the rotating direction are adjusted at the given positions. Then, rotary body 603 and holder 668 are integrated with screws 669.

Figure 23A:
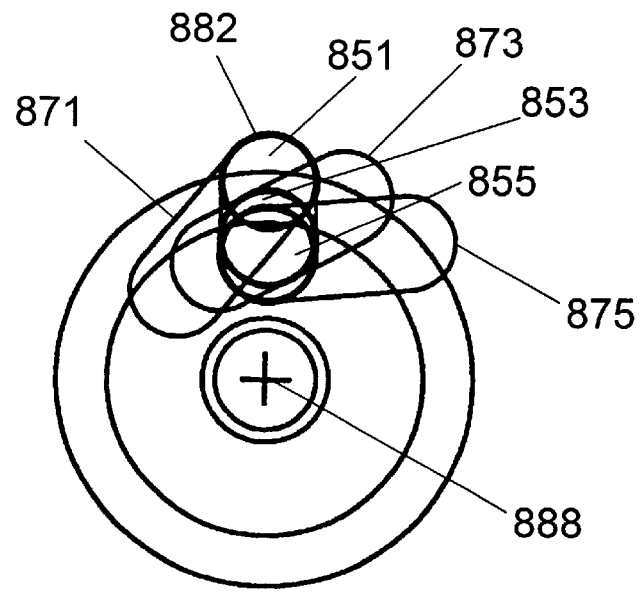
FIG. 23A is a schematic diagram illustrating the engagement of the rotary body mounted on the driver side, the roller and the rotary body on the follower side in accordance with the thirteenth exemplary embodiment of the present invention.

As shown in FIG. 23A, rotary body 603 and holder 668 are combined concentrically, and the overlapping sections of long holes 782 and 786 hold steel balls 719.

A mechanism of varying limit torque is described with reference to FIGS. 23A, 23B and 23C.

Assume that long hole 782 of rotary body 603 is fixed at position 882 in FIG. 23A. When long hole 786 of holder 668 is situated at position 871 in FIG. 23A, the steel ball is situated at position 851, i.e. the outer most spot of long hole 782 (ref. FIG. 23C).

When long hole 786 is at position 873, the ball is situated at position 853, i.e. middle of long hole 782. When long hole 786 is at position 875, the ball is at position 855, i.e. inner most of long hole 782 (ref. FIG. 23B).

In other words, a relative positional relation between rotary body 603 and holder 668 in the rotating direction can be arbitrary changed, and the ball position can be changed responsive to the relative positional relation.

Figure 23B:
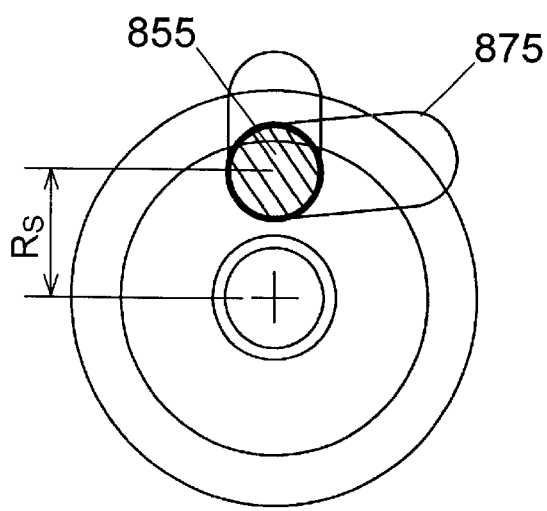
FIG. 23B is a schematic diagram illustrating the engagement of the rotary body mounted on the driver side, the roller and the rotary body on the follower side when a limit torque of the torque limiter is small in accordance with the thirteenth exemplary embodiment of the present invention.
Figure 23C:
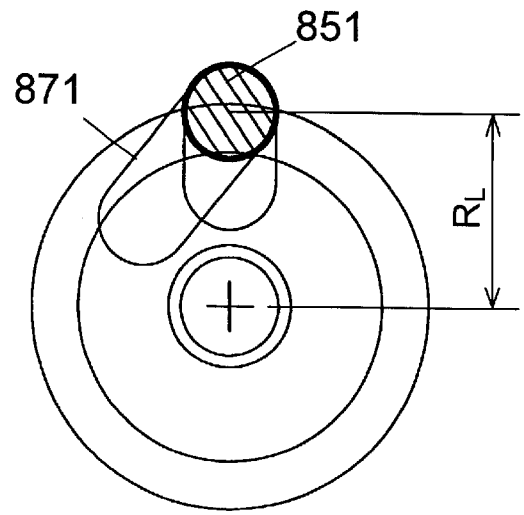
FIG. 23C is a schematic diagram illustrating the engagement of the rotary body mounted on the driver side, the roller and the rotary body on the follower side when the limit torque of the torque limiter is large in accordance with the thirteenth exemplary embodiment of the present invention.

As discussed above, this structure allows the radius between the ball center and the center of rotary body 603 to vary from RL shown in FIG. 23C to RS shown in FIG. 23B by changing the position of holder 668 in rotating direction with regard to body 603. Since radius RL is greater than radius RS, the torque transmitted to rotary body 717 on the follower side from output shaft 602 is greater in the case of FIG. 23C than FIG. 23B, provided the output torque is the same. In the meantime, the pressure force of spring 607 and the shape of protrusions provided on rotary body 717 stay the same both in FIGS. 23B and 23C. The ball needs a certain power to climb over the protrusion, and the power needed is constant for every protrusion. In the case of FIG. 23C, limit torque is set based on greater transmitted torque, therefore this case can obtain greater limit torque as a torque limiter.

Figure 24A:
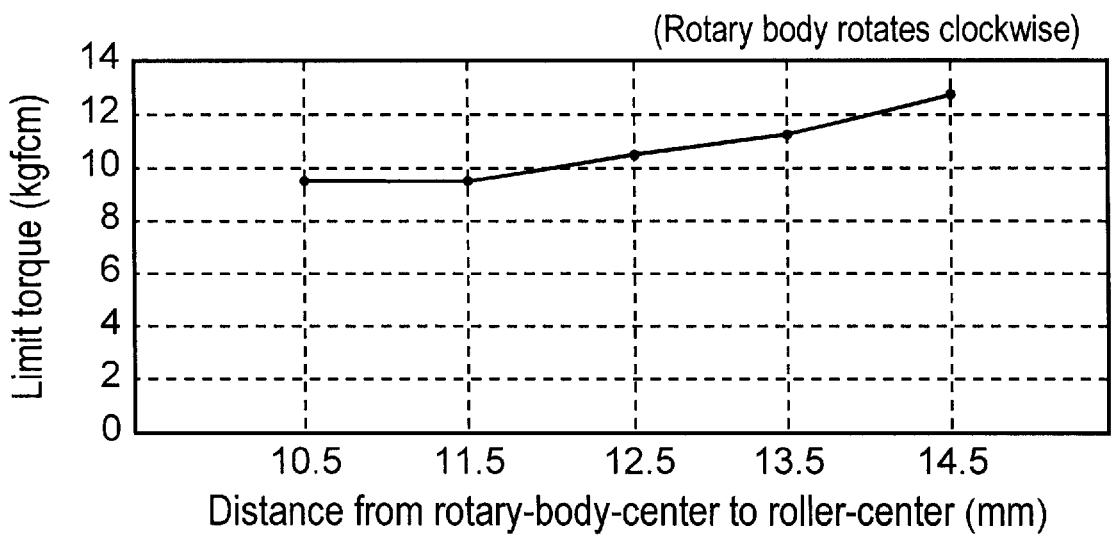
FIG. 24A shows characteristics between the distance from a driver-side-rotary-center to roller's center and the limit torque when the rotary body of the follower side rotates clockwise in accordance with the thirteenth exemplary embodiment of the present invention.
Figure 24B:
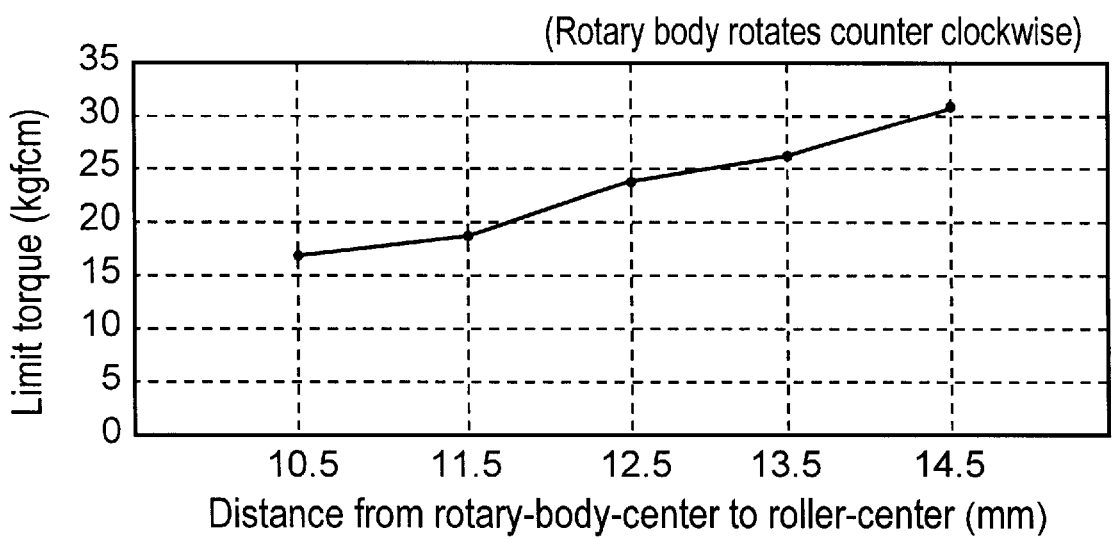
FIG. 24B shows the characteristics between the distance from a driver-side-rotary-center to roller's center and the limit torque when the rotary body of the follower side rotates counterclockwise in accordance with the thirteenth exemplary embodiment of the present invention.

FIG. 24A illustrates a relation between the limit torque and the radius from the center of rotary body 603 to the ball center, i.e. RL and Rs when rotary body 717 rotates clockwise. As this graph tells, the torque limiter has greater limit-torque at a longer radius. FIG. 24B shows characteristics when rotary body 717 rotates counter clockwise. In this case also, the torque limiter has greater limit-torque at a longer radius.

The 13th embodiment thus proves that the limit torque can be changed under the constant pressure force of spring 607. Since both the slopes of the protrusion on rotary body 717 form different angles, respective desirable torque in different rotating directions can be obtained. As comparing FIGS. 24A with FIG. 24B illustrates this matter, a limit-torque-value varies responsive to the shape differences of protrusion on rotary body 717.

The driver of the present invention is not limited to a motor with reduction gears, but other types of motors or a driving device other than the motors can produce the same result. The application of the torque limiter of the present invention is not limited to an electric shutter, but the torque limiter can be used in other apparatuses, and thus produces great industrial advantages.

What is claimed is:

1. A torque reducer included in a torque transmitter which transmits torque generated by a driver to a follower-side-rotary-body, said torque reducer discontinuing the torque transmission when excessive torque over a threshold value is loaded to the rotary body, said torque reducer providing a different threshold value for each direction of rotation of the rotary body.

2. The torque reducer as defined in claim 1, being built in said torque transmitting means, said transmitting means comprising:
    (a) an output shaft for supplying torque corresponding to torque generated by the driver;
    (b) a driver-side-rotary-body rotating together with said output shaft and having a hole for receiving a roller;
    (c) a rolling plate and a follower-side-rotary-body both being disposed on respective sides of said driver-side-rotary-body in a face-to-face manner and sandwiching the roller;
    (d) a holding protrusion disposed on said follower-side-rotary-body at a place corresponding to the hole on said driver-side-rotary-body said protrusion having a different holding force responsive to rotating directions of said follower-side rotary body and
    (e) an elastic body for urging the roller to said follower-side-rotary-body via said rolling plate,
    wherein when excessive torque over the threshold value is loaded to said follower-side-rotary-body, said rolling panel reacts pressure force of the elastic body and moves axially, and the roller climbs over the holding protrusion to discontinue the torque transmission.

3. The torque reducer as defined in claim 2 wherein said holding protrusion extends radially from a rotary center and has different slants on right and left slopes with regard to a rotating direction.

4. The torque reducer as defined in claim 2 wherein limit torque can be set arbitrarily by changing a position of the roller situated in said driver-side-rotary-holder in radial direction.

5. The torque reducer as defined in claim 3 wherein limit torque can be set arbitrarily by changing a position of the roller situated in said driver-side-rotary-holder in radial direction.

6. The torque reducer as defined in claim 1, being built in said torque transmitting means, said transmitting means comprising:
    (a) an output shaft for supplying torque corresponding to torque generated by the driver;
    (b) a driver-side-rotary-body coupled to said output shaft;
    (c) a first long hole formed on said driver-side-rotary-body;
    (d) a holder on which a second long hole formed with a different angle from the first long hole;
    (e) a roller positioned at a roller positioning section that is formed by overlapping said first long hole and the second long hole when said driver-side-rotary-body is laid on top of said holder concentrically;
    (f) a rolling panel and a follower-side-rotary-body both being disposed in a face-to-face manner on respective sides of said driver-side-rotary-body that is overlapped and integrated with said holder, and sandwiching said roller;
    (g) a holding protrusion disposed on said follower-side-rotary-body at a place corresponding to the roller positioning section; and
    (h) an elastic body for urging said roller to said follower-side-rotary-body via said rolling panel,
    wherein a limit torque value can be changed arbitrarily by adjusting an angle relatively formed by overlapping said driver-side-rotary-body and said holder in rotating direction, and changing radial distances from a rotary center to respective centers of rollers
    wherein when excessive torque over the threshold value is loaded to said follower-side-rotary-body, said rolling panel reacts pressure force of the elastic body and moves axially, and the roller climbs over the holding protrusion to discontinue the torque transmission.

7. The torque reducer as defined in claim 6 wherein said holding protrusion has different holding forces responsive to rotating directions of said follower-side-rotary-body.

8. A torque transmitter comprising:
(a) a driver;
(b) torque transmitting means for transmitting torque generated by said driver to a follower;
(c) a follower-side-rotary-body disposed on the follower side of said torque transmitting means; and
(d) a torque reducer for reducing the torque transmission when excessive torque over a threshold torque value is loaded to said follower-side-rotary-body, said torque reducer having different limit-torque-values responsive to rotating directions of said follower-side-rotary-body.

9. The torque transmitter as defined in claim 8, wherein said torque transmitting means comprises:
(a) an output shaft for supplying torque corresponding to torque generated by the driver;
(b) a driver-side-rotary-body rotating together with said output shaft and having a hole for receiving a roller;
(c) a rolling plate and a follower-side-rotary-body both being disposed on respective sides of said driver-side-rotary-body in a face-to-face manner and sandwiching the roller;
(d) a holding protrusion disposed on said follower-side-rotary-body at a place corresponding the hole on said driver-side-rotary-body; and
(e) an elastic body for urging the roller to said follower-side-rotary-body via said rolling plate,
wherein said protrusion has different holding forces responsive to rotating directions of said follower-side-rotary-body,
wherein said torque limiter works when excessive torque over the threshold value is loaded to said follower-side-rotary-body, said rolling panel reacts pressure force of the elastic body and moves axially, and the roller climbs over the holding protrusion to discontinue the torque transmission.

10. The torque transmitter as defined in claim 9 wherein plurality of said holding protrusions are provided radially and have different slant angles formed by left and right slopes with regard to a rotating direction of said rotary-body.

11. The torque transmitter as defined in claim 9 wherein limit torque can be set arbitrarily by changing a position of the roller situated in said driver-side-rotary-holder in radial direction.

12. The torque transmitter as defined in claim 10 wherein limit torque can be set arbitrarily by changing a position of the roller situated in said driver-side-rotary-holder in radial direction.

13. The torque transmitter as defined in claim 8, wherein said transmitting means comprises:
(a) an output shaft for supplying torque corresponding to torque generated by the driver;
(b) a driver-side-rotary-body coupled to said output shaft;
(c) a first long hole formed on said driver-side-rotary-body;
(d) a holder on which a second long hole formed with a different angle from the first long hole;
(e) a roller positioned at a roller positioning section that is formed by overlapping said first long hole and the second long hole when said driver-side-rotary-body is laid on top of said holder concentrically;
(f) a rolling panel and a follower-side-rotary-body both being disposed in a face-to-face manner on respective sides of said driver-side-rotary-body that is overlapped and integrated with said holder, and sandwiching said roller;
(g) a holding protrusion disposed on said follower-side-rotary-body at a place corresponding to the roller positioning section; and
(h) an elastic body for urging said roller to said follower-side-rotary-body via said rolling panel,
wherein a limit torque value can be changed arbitrarily by adjusting an angle relatively formed by overlapping said driver-side-rotary-body and said holder in rotating direction, and changing radial distances from a rotary center to respective centers of rollers
wherein said torque limiter works when excessive torque over the threshold value is loaded to said follower-side-rotary-body, said rolling panel reacts pressure force of the elastic body and moves axially, and the roller climbs over the holding protrusion to discontinue the torque transmission.

14. The torque transmitter as defined in claim 13 wherein said holding protrusion has different holding forces responsive to rotating directions of said follower-side-rotary-body.

15. The torque transmitter as defined in claim 8 wherein said transmitter is employed in an electric shutter.

16. The torque transmitter as defined in claim 9 wherein said transmitter is employed in an electric shutter.

17. The torque transmitter as defined in claim 13 wherein said transmitter is employed in an electric shutter.

* * * * *